(12) United States Patent
Ota

(10) Patent No.: US 9,566,755 B2
(45) Date of Patent: Feb. 14, 2017

(54) FOAMED SYNTHETIC RESIN MOLDED BODY AND METHOD FOR PRODUCING SAME

(75) Inventor: Masato Ota, Yokohama (JP)

(73) Assignee: BRIDGESTONE CORPORATION, Tokyo (JP)

(*) Notice: Subject to any disclaimer, the term of this patent is extended or adjusted under 35 U.S.C. 154(b) by 674 days.

(21) Appl. No.: 14/004,038

(22) PCT Filed: Mar. 12, 2012

(86) PCT No.: PCT/JP2012/056236
§ 371 (c)(1),
(2), (4) Date: Sep. 9, 2013

(87) PCT Pub. No.: WO2012/132848
PCT Pub. Date: Oct. 4, 2012

(65) Prior Publication Data
US 2013/0344284 A1 Dec. 26, 2013

(30) Foreign Application Priority Data

Mar. 28, 2011 (JP) ................................. 2011-069414

(51) Int. Cl.
*B29C 67/20* (2006.01)
*B29D 99/00* (2010.01)
(Continued)

(52) U.S. Cl.
CPC ............ *B29D 99/0092* (2013.01); *A47C 7/18* (2013.01); *B29C 44/1252* (2013.01);
(Continued)

(58) Field of Classification Search
CPC . B29D 99/0092; B29C 44/588; B29C 44/583; B29C 44/1252; A47C 7/18; B60N 2/7017; Y10T 428/24273; B29L 2031/771
See application file for complete search history.

(56) References Cited

U.S. PATENT DOCUMENTS 5,098,271 A * 3/1992 Yanagishita ............ B29C 44/58
249/141
6,358,592 B2 * 3/2002 Vair, Jr. ................ D04H 1/5405
428/131
(Continued)

FOREIGN PATENT DOCUMENTS

EP 2 404 530 A1 1/2012
JP 55-166622 U 12/1980
(Continued)

OTHER PUBLICATIONS

International Search Report, PCT/JP2012/056236, dated Jun. 5, 2012.

*Primary Examiner* — Galen Hauth
(74) *Attorney, Agent, or Firm* — Sughrue Mion, PLLC

(57) ABSTRACT

Provided is a method for producing a foamed synthetic resin molded body. In this method, in the case where a hole-like portion is a through hole, when foam molding is performed, the occurrence of molding defects such as voids at the periphery of the hole-like portion can be sufficiently prevented or suppressed without forming a burr portion that closes the hole-like portion. Also in this method, in the case where the hole-like portion is a non-through hole, the occurrence of molding defects such as voids at a bottom portion of the hole-like portion can be sufficiently prevented or suppressed.

14 Claims, 13 Drawing Sheets

(51) Int. Cl.
*B29C 44/12* (2006.01)
*B29C 44/58* (2006.01)
*B60N 2/70* (2006.01)
*A47C 7/18* (2006.01)
*B29L 31/00* (2006.01)

(52) U.S. Cl.
CPC .......... *B29C 44/583* (2013.01); *B29C 44/588* (2013.01); *B60N 2/7017* (2013.01); *B29L 2031/771* (2013.01); *Y10T 428/24273* (2015.01)

(56) References Cited

U.S. PATENT DOCUMENTS

| | | | |
|---|---|---|---|
| 6,695,939 B1 * | 2/2004 | Nakamura | B29C 43/203 |
| | | | 156/222 |
| 2004/0000738 A1 * | 1/2004 | Tanaka | B29C 33/0033 |
| | | | 264/46.6 |
| 2004/0090106 A1 | 5/2004 | Senoo | |
| 2005/0255306 A1 * | 11/2005 | Wolff | B29C 44/0415 |
| | | | 428/304.4 |

FOREIGN PATENT DOCUMENTS

| | | |
|---|---|---|
| JP | 58-101027 A | 6/1983 |
| JP | 59-152824 A | 8/1984 |
| JP | 01-200919 A | 8/1989 |
| JP | 2000-102934 A | 4/2000 |
| JP | 2003-205187 A | 7/2003 |
| JP | 2008-154839 A | 7/2008 |
| WO | 2010/100880 A1 | 9/2010 |

* cited by examiner

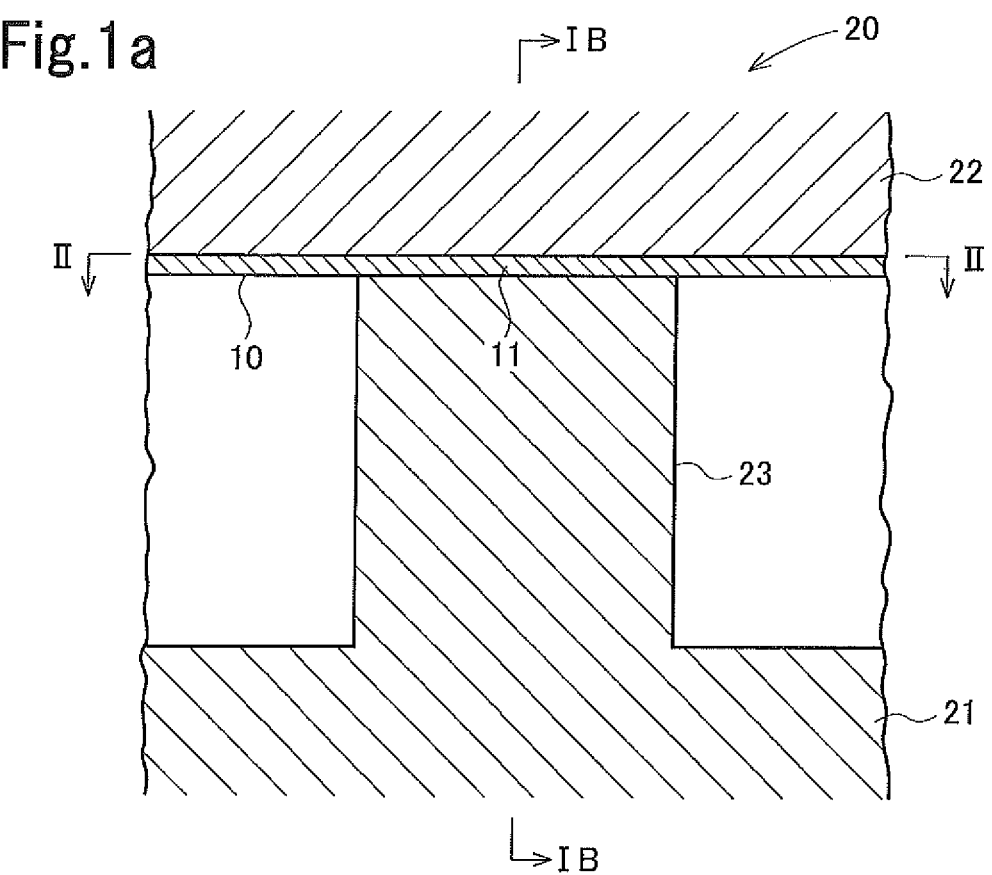

FOAMED SYNTHETIC RESIN MOLDED BODY AND METHOD FOR PRODUCING SAME

TECHNICAL FIELD

The present invention relates to a foamed synthetic resin molded body having a hole-like portion such as a through hole in the outer surface thereof and a method for producing the foamed synthetic resin molded body.

BACKGROUND ART

Seats such as vehicle seats and sofas placed in a house have a seat pad and a skin material. The seat pad is formed of a foamed synthetic resin such as a flexible polyurethane foam or a semirigid polyurethane foam. The skin material is disposed on the surface of the seat pad.

Nowadays, in some case, an airbag device is installed in a vehicle seat so as to inflate an airbag between the occupant and the side surface of a vehicle cabin when, for example, a vehicle is involved in a side crash or a vehicle is overturned. In this case, a through hole or a recess in which the airbag device is housed may be formed in a seat pad. In addition to the above-described case, a variety of hole-like portions may be formed in the seat pad. Examples of the hole-like portions include a recess with which a seat frame is engaged and through holes into which support legs of a head rest, speakers, and so forth are inserted.

In order to form a seat pad having a hole-like portion with a mold, a projection for forming the hole-like portion is provided on the inner surface of the mold. The outer shape of the projection is the same as the inner shape of the hole-like portion. When a seat pad main body is formed by foaming the material of a foamed synthetic resin in the mold, the hole-like portion is formed at a portion where the projection was present after the seat pad has been demolded.

FIG. 15a is a longitudinal sectional view illustrating an outline of a typical related-art mold for forming a seat pad having a through hole. FIG. 15b is a longitudinal sectional view of the seat pad formed with this mold. As illustrated in FIG. 15a, a mold 110 includes an upper die 111 and a lower die 112 (and a core according to need). A seat pad 100 is formed by supplying a raw material of a foamed material such as urethane into the lower die 112, clamping together the upper and lower dies 111 and 112, and foaming the raw material. In general, in the mold 110, the seat pad 100 is formed in a position in which a surface thereof opposing an occupant seated in the seat facing downward. In this related-art example, a reinforcing member 101 is integrally formed with a surface of the seat pad 100 opposite to the surface opposing an occupant seated in the seat (hereafter, this opposite surface may be referred to as a rear surface).

In this related-art example, a projection 113 for forming a hole projects from a cavity bottom surface of the lower die 112. By using the projection 113, a hole 102 is formed from the surface opposing an occupant seated in the seat toward the rear surface in the seat pad 100. That is, the hole 102 is formed at a portion where the projection 113 was present during foam molding.

I a state in which the upper and lower dies 111 and 112 are clamped together, a tip end surface (upper end surface) of the projection 113 is slightly separated from a cavity top surface of the upper die 111. The separation is intended to ensure that the upper and lower dies 111 and 112 are in tight contact with each other at a surface where the upper and lower dies 111 and 112 are in contact with each other. The separation is also intended to prevent air from accumulating around the hole 102 during foam molding. That is, by separating the tip end surface of the projection 113 from the cavity top surface of the upper die 111 as described above, even when, during foam molding, air remains in a corner portion where an outer peripheral surface of the projection 113 and the cavity top surface of the upper die 111 intersect each other, the air together with foamed resin enters the gap between the projection 113 and the upper die 111. Accordingly, in the seat pad 100 formed with this mold 110 by foam molding, a burr portion 103 that closes the hole 102 is formed as illustrated in FIG. 15b because the foamed resin enters the gap between the projection 113 and the upper die 111 during foam molding. Thus, the burr portion 103 needs to be removed after the seat pad 100 is demolded.

Japanese Utility Model Publication S55-166622A describes a mold for forming a seat pad. With this mold, removal of the burr portion 103 can be facilitated. FIG. 16a is a longitudinal sectional view of the mold described in the above-described document. FIG. 16b is a longitudinal sectional view of a seat pad formed with this mold. As illustrated in FIG. 16a, in this mold 110', a recess 114 recessed toward the outside of the mold 110' is provided in a region of the cavity top surface of the upper die 111, the region opposing the tip end surface of the projection 113. During foam molding, the foamed resin enters the recess 114 through the gap between the tip end surface of the projection 113 and the cavity top surface of the upper die 111. Accordingly, in a seat pad 100' formed with this mold 110', a burr block 104 is formed of the foamed resin having entered the recess 114 so as to protrude from the outer surface of the seat pad 100' as illustrated in FIG. 16b. Thus, when removing the burr portion 103 that closes the hole 102 after the seat pad 100' has been demolded, the burr portion 103 can be easily removed by picking up the burr block 104.

Japanese Patent Publication 2008-154839A describes a groove (not shown) provided in the surface of the seat pad 100. The groove indicates an area (contour) of the hole 102. In order to remove the burr portion 103 that closes the hole 102 with a cutting means (not shown) such as a cutter, the groove facilitates the removal of the burr portion 103. Japanese Unexamined Patent Application Publication No. 2008-154839 also describes that a cutting recess (not shown) is provided inside this area so as to be in contact with the groove. In order to remove the burr portion 103, the cutting means is inserted into the cutting recess, and the foam is cut from this position along the groove. This allows the burr portion 103 to be comparatively easily removed. According to the above-described document, a housing portion, in which a side airbag device is housed, is defined by the hole 102 after the burr portion 103 has been removed.

In the case where the hole 102 is a non-through hole, in a state in which the mold 110 is clamped, a gap having a predetermined size is formed between the tip end surface of the projection 113 and the cavity top surface of the upper die 111. When the foamed resin enters the gap between the projection 113 and the upper die 111 during foam molding, a bottom portion of a non-through hole 102 is formed.

CITATION LIST

Patent Literature

Patent Literature 1: Japanese Utility Model Publication S55-166622A

Patent Literature 2: Japanese Patent Publication 2008-154839A

SUMMARY OF INVENTION

Technical Problem

According to the above-described Japanese Unexamined Utility Model Publication 555-166622A and Japanese Patent Publication 2008-154839A, although the hole 102 is a through hole, the burr portion 103 is formed of urethane foam so as to close the hole 102 during foam molding of the seat pad 100 (or 100'), and after the seat pad 100 (or 100') has been demolded, the burr portion 103 is removed. Thus, the urethane raw material used for forming the burr portion 103 is wasted.

In the case where the hole 102 is a non-through hole, as the thickness of the foam at the bottom portion of the hole 102 decreases (that is, as the gap between the tip end surface of the projection 113 and the cavity top surface of the upper die 111 decreases in a state in which the mold 110 is clamped) it becomes difficult for the urethane raw material to enter the space between the tip end surface of the projection 113 and the cavity top surface of the upper die 111 during foam molding. Thus, voids or other molding defects easily may easily occur at the bottom portion of the hole 102.

In the case where the hole-like portion is a through hole, an object of the present invention is, in a method for producing a foamed synthetic resin molded body having a hole-like portion in its outer surface, to allow the occurrence of molding defects such as voids at the periphery of the hole-like portion to be sufficiently prevented or suppressed without forming a burr portion that closes the hole-like portion when foam molding is performed. In the case where the hole-like portion is a non-through hole, an object of the present invention is to allow the occurrence of molding defects such as voids at a bottom portion of the hole-like portion to be sufficiently prevented or suppressed. It is also an object of the present invention to provide a foamed synthetic resin molded body produced by this production method.

Solution to Problem

A method for producing a foamed synthetic resin molded body according to a first aspect is a method for producing a foamed synthetic resin molded body having a hole-like portion in an outer surface thereof using a mold for foam molding that includes at least a first die and a second die. In this method, a projection for forming the hole-like portion is provided on a cavity inner surface of the first die. In this method, when the mold for foam molding is clamped, in the mold for foam molding, a tip end surface of the projection in a projecting direction opposes a cavity inner surface of the second die with a predetermined gap formed therebetween, and, when the foamed synthetic resin molded body is formed by foam molding, gas in the mold for foam molding is introduced into a space between the tip end surface of the projection and the cavity inner surface of the second die by gas introduction means.

In the method for producing the foamed synthetic resin molded body according to a second aspect, the gas introduction means has an intermediate body disposed between the tip end surface of the projection and the cavity inner surface of the second die in a state in which the mold for foam molding is clamped, and the intermediate body is formed of a material having a high air permeability of 20 to 350 cc/cm²/second.

In the method for producing the foamed synthetic resin molded body according to a third aspect, a reinforcing member is disposed along at least part of an outer surface of the foamed synthetic resin molded body, the reinforcing member is integrally formed with the foamed synthetic resin molded body so as to be integrated with the foamed synthetic resin molded body, and the intermediate body is provided so as to be integral with the reinforcing member.

In the method for producing the foamed synthetic resin molded body according to a fourth aspect, the intermediate body is formed of a fiber assembly, the unit weight of which is 50 to 250 g/m².

In the method for producing the foamed synthetic resin molded body according to a fifth aspect, the intermediate body is disposed so as to cross the hole-like portion.

In the method for producing the foamed synthetic resin molded body according to a sixth aspect, in the state in which the mold for foam molding is clamped, the tip end surface of the projection opposes both of the cavity inner surface of the second die and a cavity inner surface of another die, and the mold for foam molding includes gas exhaust means that exhausts the gas in the mold for foam molding to the outside of the mold for foam molding through a parting line between the second die and the other die.

A foamed synthetic resin molded body according to a seventh aspect is produced by the method for producing the foamed synthetic resin molded body according to any one of the first to sixth aspects.

A foamed synthetic resin molded body according to an eighth aspect is a seat pad.

Advantageous Effects of Invention

In the method for producing the foamed synthetic resin molded body according to the present invention, when the foamed synthetic resin molded body is formed by foam molding, gas in the mold for foam molding (hereafter, referred to as mold for short) is introduced by the gas introduction means to the space between the tip end surface of the projection for forming the hole-like portion in the foamed synthetic resin molded body and the cavity inner surface that opposes the tip end surface of the projection. Thus, in the case, for example, where the hole-like portion is a through hole, the gas can be prevented from remaining in a corner portion where the outer surface of the projection intersects the cavity inner surface. Unlike the aforementioned related art, this can be performed without causing the foamed synthetic resin to enter the space between the projection and the cavity inner surface so as to form the burr portion. As a result, molding defects such as voids at the periphery of the through hole can be sufficiently prevented from occurring without forming the burr portion that closes the through hole.

In the case where the hole-like portion is a non-through hole, the foamed synthetic resin is caused to enter the space between the projection and the cavity inner surface. According to the present invention, the gas in the mold is introduced into the space between the projection and the cavity inner surface when foam molding is performed. By doing this, even in the case where the gap between the projection and the cavity inner surface is comparatively small, the foamed synthetic resin smoothly enters the space between these surfaces. Thus, even when the thickness of the bottom surface of the hole-like portion is comparatively small, the occurrence of molding defects in the bottom surface of the hole-like portion can be sufficiently prevented.

According to the second aspect, when the mold is clamped, the intermediate body formed of a material having a high air permeability of 20 to 350 cc/cm$^2$/second is disposed between the tip end surface of the projection and the cavity inner surface. Thus, when foam molding is performed, the gas in the mold can be effectively introduced into the space between the tip end surface of the projection and the cavity inner surface by the intermediate body. Accordingly, with this intermediate body, a sufficiently effective gas introduction means having a simple structure can be configured.

Preferably, the intermediate body is provided so as to be integral with the reinforcing member, which is integrally formed with the foamed synthetic resin. With such a structure, the intermediate body together with the reinforcing member can be easily set in the mold. In this case, after the foamed synthetic resin molded body has been demolded, the intermediate body may be removed from or remain integral with the reinforcing member.

As the material of the intermediate body, a fiber assembly, the unit weight of which is 50 to 250 g/m$^2$, is convenient and preferable.

By disposing the intermediate body so as to cross the hole-like portion of the foamed synthetic resin molded body, when foam molding is performed, the gas in the mold can be efficiently introduced into the space between the projection and the cavity inner surface through both sides of the projection.

According to the sixth aspect, when foam molding is performed, the gas having been introduced into the space between the projection and the cavity inner surface can be exhausted by the gas exhaust means to the out side of the mold through the parting line facing the space between the projection and the cavity inner surface. Thus, the gas can be more effectively prevented from remaining in the corner portion between the projection and the cavity inner surface.

In a foamed synthetic resin molded body produced by the production method according to the invention, the occurrence of molding defects at the periphery of the hole-like portion and in the bottom surface (in the case where the hole-like portion is a non-through hole) can be prevented. Thus, a form accuracy of the outer surface is improved.

As described in claim 8, the foamed synthetic resin molded body according to the present invention is preferably applied to a seat pad.

BRIEF DESCRIPTION OF DRAWINGS

FIG. 1a is a longitudinal sectional view of a mold for foam molding used in a method for producing a foamed synthetic resin molded body according to an embodiment.

FIG. 2 is a plan view of a portion taken along line II-II in FIG. 1a.

FIG. 5a is a perspective view of the foamed synthetic resin molded body produced with the mold for foam molding illustrated in FIG. 1a.

FIG. 5b is a perspective view of the foamed synthetic resin molded body produced with the mold for foam molding illustrated in FIG. 1a.

FIG. 8b is a sectional view taken along line VIIIB-VIIIB in FIG. 8a.

FIG. 12 is a perspective view of the foamed synthetic resin molded body produced with the mold for foam molding illustrated in FIG. 8a.

DESCRIPTION OF EMBODIMENTS

Embodiments will be described below with reference to the drawings. In the following embodiments, a seat pad for a vehicle is described as an example of a foamed synthetic resin molded body. However, the present invention can also be applied to a foamed synthetic resin molded body included in a seat pad for an application other than that for a vehicle, a foamed synthetic resin molded body other than a seat pad, and a method for producing any of these foamed synthetic resin molded bodies.

[First Embodiment]

Figure 1B:
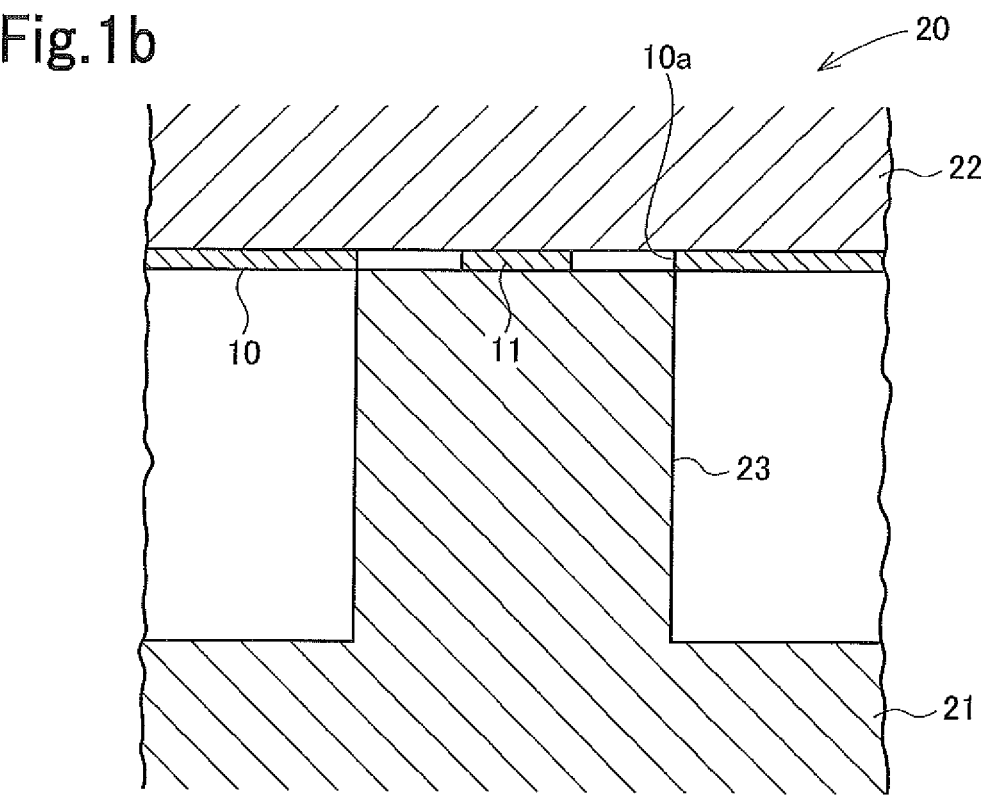
FIG. 1b is a longitudinal sectional view of the mold for foam molding used in the method for producing the foamed synthetic resin molded body according to the embodiment.
Figure 2:
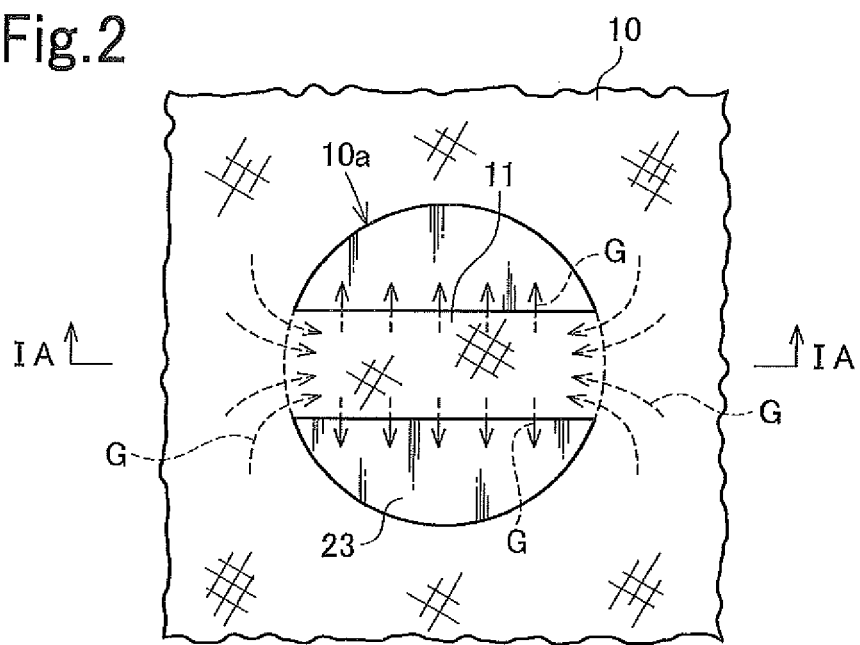
Figure 3:
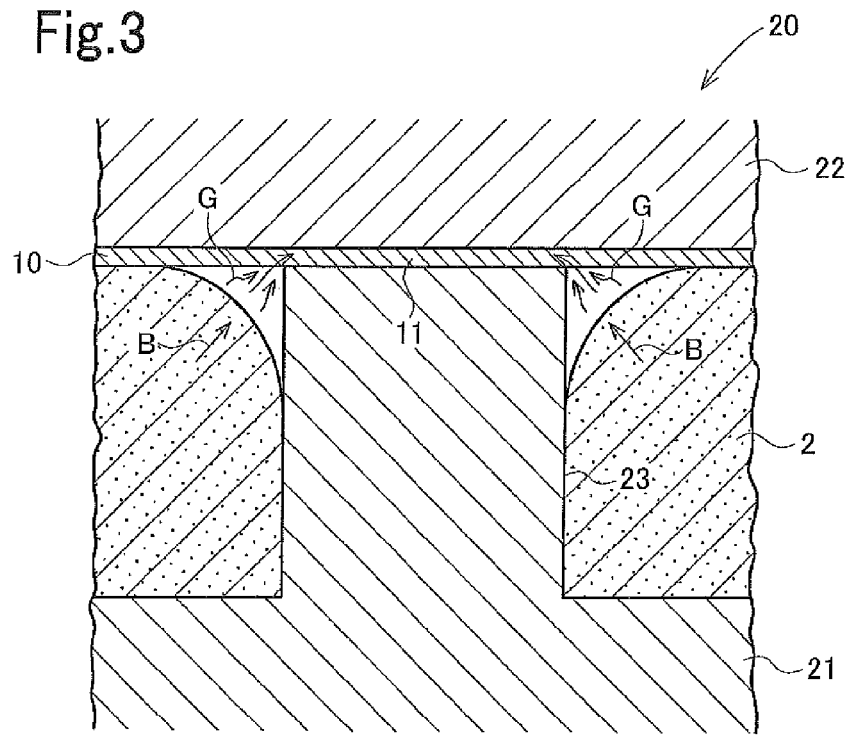
FIG. 3 is a longitudinal sectional view of a portion similar to that illustrated in FIG. 1a during foam molding.
Figure 4:
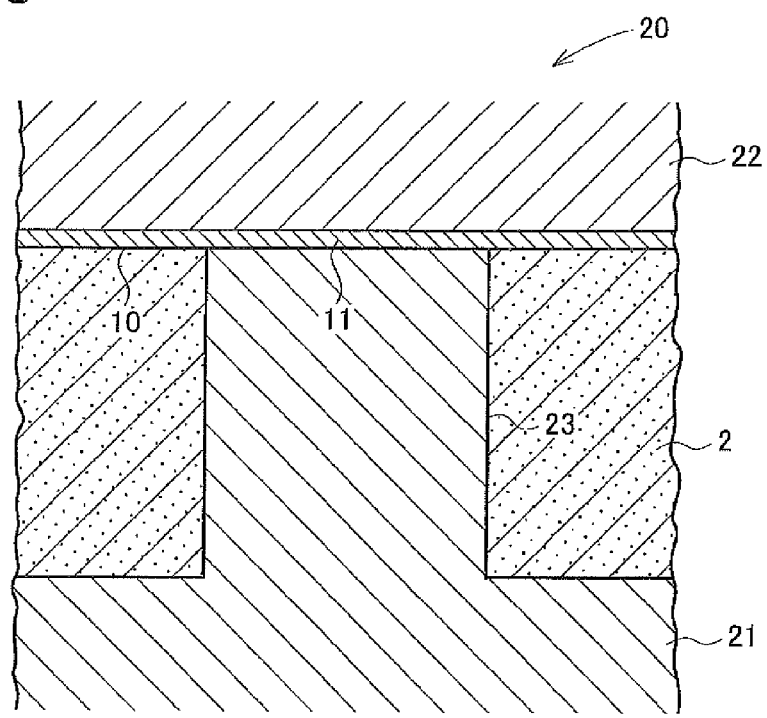
FIG. 4 is a longitudinal sectional view of a portion similar to that illustrated in FIG. 1a when foam molding is completed.
Figure 5A:
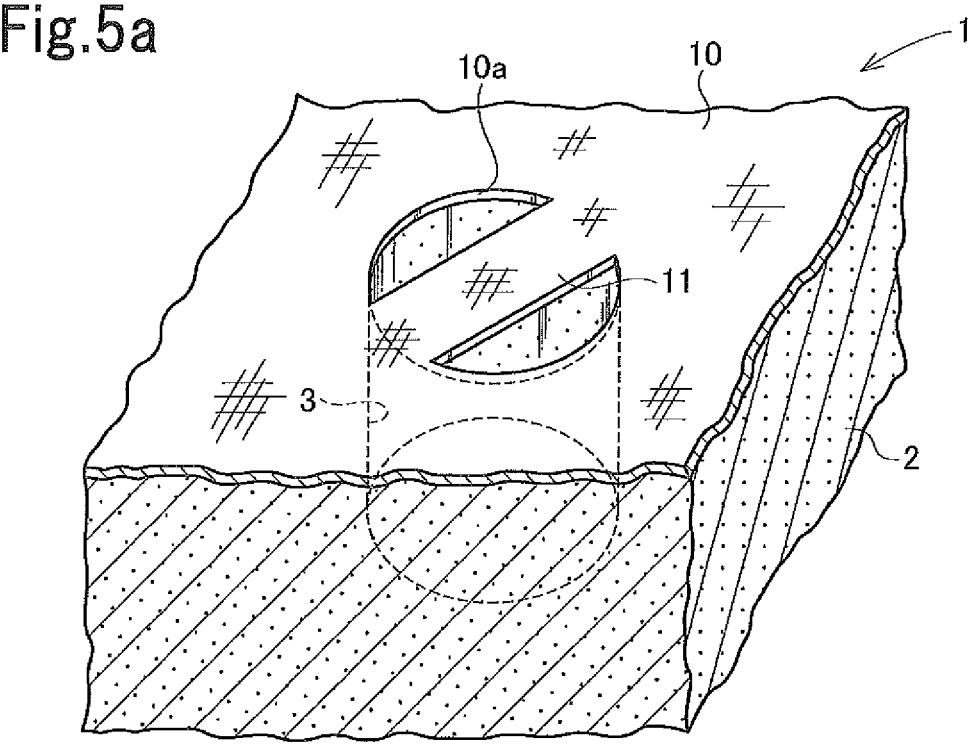
Figure 5B:
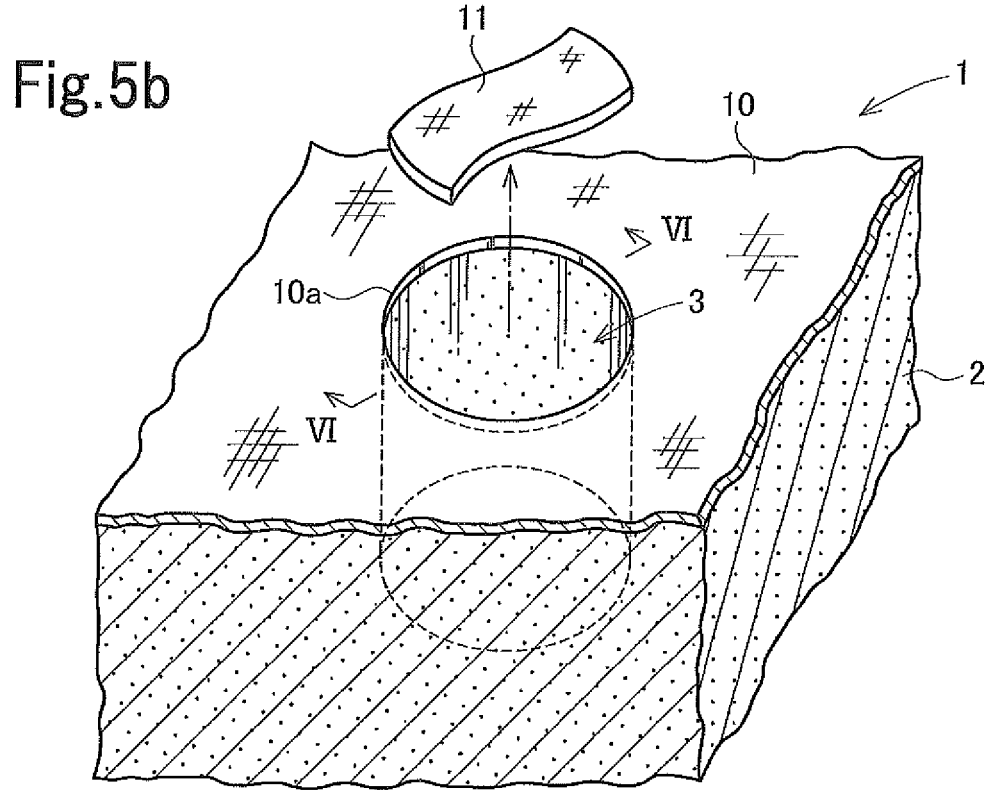
Figure 6:
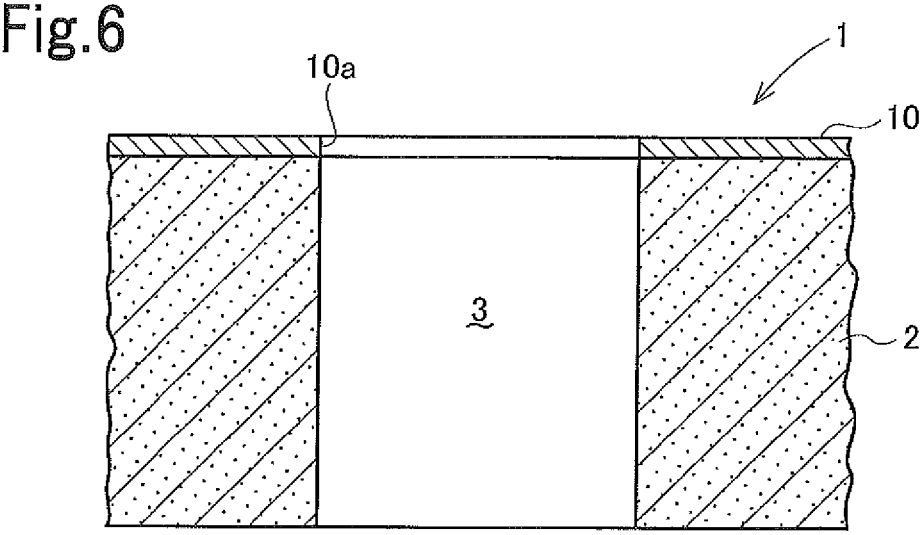
FIG. 6 is a sectional view taken along line VI-VI in FIG. 5b.

FIGS. 1a and 1b are longitudinal sectional views of a mold for foam molding used in a method for producing a foamed synthetic resin molded body according to an embodiment. FIG. 1a illustrates a section taken along line IA-IA in FIG. 2, and FIG. 1b illustrates a section taken along line IB-IB in FIG. 1a. FIG. 2 is a plan view taken along line II-II in FIG. 1a. FIG. 3 is a longitudinal sectional view of a portion similar to that illustrated in FIG. 1a during foam molding. FIG. 4 is a longitudinal sectional view of a portion similar to that illustrated in FIG. 1a when foam molding is completed. FIGS. 5a and 5b are perspective views of a through hole and a region around the through hole of a seat pad serving as a foamed synthetic resin molded body produced by using the mold for foam molding. FIG. 5a illustrates a state in which an intermediate body as a gas introduction means has not yet been cut out, and FIG. 5b illustrates a state in which the intermediate body has been cut out. FIG. 6 is a sectional view taken along line VI-VI in FIG. 5b.

In the present embodiment, the foamed synthetic resin molded body is a seat pad 1 included in a vehicle seat. The seat pad 1 includes a seat pad main body 2 and a reinforcing member 10. The seat pad main body 2 is formed of a foamed synthetic resin such as polyurethane foam. The reinforcing member 10 is disposed along a rear surface (a surface on a side opposite to a side where an occupant is seated) of the seat pad main body 2. The reinforcing member 10 is integrally formed with the seat pad main body 2 so as to be integrated with the seat pad main body 2. Although the reinforcing member 10 is formed of a non-woven fabric or the like, this does not limit the material of the reinforcing member 10. In the present embodiment, a through hole 3 is formed in the seat pad 1 as a hole-like portion. The through hole 3 penetrates through the seat pad main body 2 from the front side (a side where the occupant is seated) of the seat pad main body 2 to the rear side of the seat pad main body 2. The reinforcing member 10 has an opening 10a, which is superposed with the through hole 3. In the present embodiment, the through hole 3 has a substantially circular sectional shape in a direction perpendicular to the axial direction thereof. However, the shape and arrangement of the through hole 3 are not limited to these.

In the present embodiment, a mold 20 for forming the seat pad main body 2 by foam molding includes a lower die 21 and an upper die 22. In the present embodiment, the lower die 21 corresponds to a first die in claim 1 and the upper die 22 corresponds to a second die in claim 1. The structure of the mold 20 is not limited to the above description. For example, the mold 20 may further include an intermediate die or the like according to need. In a cavity of the mold 20, the seat pad 1 is formed in a position in which the front side of the seat pad 1 faces downward. That is, the front side of the seat pad 1 is formed by an cavity inner surface (bottom surface) of the lower die 21, and the rear side of the seat pad 1 is formed by a cavity inner surface (top surface) of the upper die 22. A projection 23 for forming the through hole 3 projects from the cavity bottom surface of the lower die 22 toward the cavity top surface of the upper die 22. Before clamping of the lower die 21 and the upper die 22, the reinforcing member 10 is disposed along the cavity top surface of the upper die 22. The reinforcing member 10 is held at the cavity top surface of the upper die 22 with a retaining means (not shown) such as a clip, a pin, a magnet, or the like. In so doing, the opening 10a of the reinforcing member 10 is, as illustrated in FIGS. 1b and 2, disposed at a region of the cavity top surface of the upper die 22, the region opposing a tip end surface of the projection 23 on the projecting side (hereafter, referred to as "tip end surface" for short).

In this mold 20, when the upper die 22 and the lower die 21 are clamped together, the tip end surface of the projection 23 opposes the cavity top surface of the upper die 22 with a predetermined gap formed therebetween. In the present embodiment, the gap between the tip end surface of the projection 23 and the cavity top surface of the upper die 22 in a clamped state is set to have such a size that gas in the mold 20 can enter the gap and the raw material of the foamed synthetic resin foamed in the mold 20 cannot enter the gap.

The gap between the tip end surface of the projection 23 and the cavity top surface of the upper die 22 in the clamped state is set in accordance with the viscosity of the raw material of the foamed synthetic resin at a time when the raw material of the foamed synthetic resin having been foamed in the mold 20 reaches a tip end portion of the projection 23. Specifically, the gap between the tip end surface of the projection 23 and the cavity top surface of the upper die 22 is preferably from 0.1 to 3 mm, and particularly preferably from 0.5 to 1.5 mm.

By setting the gap between the tip end surface of the projection 23 and the cavity top surface of the upper die 22 in the clamped state as described above, unlike the aforementioned related art, the seat pad main body 2 can be foam molded substantially without forming the burr portion that closes the through hole 3, that is, the through hole 3 penetrates through the seat pad main body 2 from the start of the foam molding. The gap between the tip end surface of the projection 23 and the cavity top surface of the upper die 22 in the clamped state may be uniform over the entire tip end surface of the projection 23 or may be partly varied in the tip end surface of the projection 23.

In the present embodiment, when the mold 20 is clamped, an intermediate body 11 formed of a material having a high air permeability is disposed between the tip end surface of the projection 23 and the cavity top surface of the upper die 22. In the present embodiment, the intermediate body 11 is included in the gas introduction means that introduces the gas in the mold 20 into the space between the tip end surface of the projection 23 and the cavity top surface of the upper die 22 during foam molding.

The air permeability of the material having a high air permeability, which forms the intermediate body 11, is preferably from 20 to 350 cc/cm$^2$/second, and particularly preferably from 50 to 200 cc/cm$^2$/second. The air permeability is measured in accordance with a Frazier method. Examples of preferable materials having a high air permeability as described above includes fiber assemblies such as a non-woven cloth, a textile fabric, cotton, felt, glass wool, rock wool, and paper, or materials having an open-cell structure (that is, having air permeability) such as urethane foam. A fiber that forms the fiber assembly is preferably, for example, a polyethylene fiber, a polypropylene fiber, or the like. In the case where the intermediate body 11 is formed of a fiber assembly, the unit weight of the fiber assembly to be used is preferably from 50 to 250 g/m$^2$ and particularly preferably from 80 to 140 g/m$^2$, and the air permeability of the fiber assembly to be used is preferably from 20 to 350 cc/cm$^2$/second and particularly preferably from 50 to 200 cc/cm$^2$/second. The material of the intermediate body 11 is not limited to any of the above-described materials.

In the present embodiment, the intermediate body 11 has a belt-like shape. As illustrated in FIGS. 1a, 1b, and 2, the intermediate body 11 is disposed so as to cross the tip end surface of the projection 23. Both the end sides of the intermediate body 11 in the longitudinal direction reach an outer peripheral edge of the tip end surface of the projection 23. Both the end sides of the intermediate body 11 are communicated with the inside of the mold 20 through the space between the tip end surface of the projection 23 and the cavity top surface of the upper die 22 in the clamped state (as will be described later, in the present embodiment, both the end sides of the intermediate body 11 are communicated with the inside of the mold 20 through the reinforcing member 10). By extending the intermediate body 11 in such an elongated manner, the intermediate body 11 is easily disposed between the tip end surface of the projection 23 and the cavity top surface of the upper die 22. Furthermore, gas in the mold 20 can be efficiently introduced into the space between the tip end surface of the projection 23 and the cavity top surface of the upper die 22 during foam molding.

It is sufficient that at least part of the intermediate body 11 be communicated with the inside of the mold 20 through the space between the tip end surface of the projection 23 and the cavity top surface of the upper die 22 in the clamped state.

The entirety of the outer surface of the intermediate body 11 allows the entrance of gas from the outside to the inside of the intermediate body 11 and diffusion of gas from the inside to the outside of the intermediate body 11. That is, as indicated by the arrows G in FIG. 2, during foam molding, the intermediate body 11 can diffuse the gas that has entered the inside of the intermediate body 11 from both the end sides due to pressure applied by the foamed synthetic resin through both the side edges to the gap between the tip end surface of the projection 23 and the cavity top surface of the upper die 22 (the gaps between the intermediate body 11 and the opening 10a of the reinforcing member 10). The shape and arrangement of the intermediate body 11 is not limited to this. For example, the intermediate body 11 may cover the entire tip end surface of the projection 23.

In the present embodiment, the intermediate body 11 is integrated with the reinforcing member 10. Each end side of the intermediate body 11 is continuous with an inner peripheral edge of the opening 10a of the reinforcing member 10. Particularly in the present embodiment, the intermediate body 11 and the reinforcing member 10 are provided so as to be continuous and integral with each other using a common material (non-woven cloth in the present embodiment). However, the structure of the intermediate body 11 is not limited to this. For example, the intermediate body 11 may be formed of a material having a high air permeability, the material being different from that of the reinforcing member 10. Alternatively, the intermediate body 11 may be disposed so as to cross the opening 10a with both the end sides thereof attached to the reinforcing member 10 by an attachment means such as stitching or adhesion. The intermediate body 11 is not necessarily integrated with the reinforcing member 10. In the case where the intermediate body 11 and the reinforcing member 10 are continuously and integrally formed with each other of a common material (that is, a material having a high air permeability), during the foam molding, gas in the mold 20 can enter also the inside of the reinforcing member 10 and smoothly moves to the intermediate body 11 through the inside of the reinforcing member 10.

The air permeability of the intermediate body 11 increases as the width and thickness thereof increase. In the case where the width of the intermediate body 11 is excessively small, the intermediate body 11 easily tears, and it is difficult to attach the intermediate body 11 in the mold 20. In the case where the width of the intermediate body 11 is excessively large, it takes time to cut out the intermediate body 11 at a later stage. Thus, the width of the intermediate body 11 is preferably from 5 to 100 mm and particularly preferably from 5 to 50 mm. The thickness of the intermediate body 11 is preferably slightly larger than the gap between the tip end surface of the projection 23 and the cavity top surface of the upper die 22 in a state in which the mold 20 is clamped. In this case, when the mold 20 is clamped, the intermediate body 11 is disposed between the tip end surface of the projection 23 and the cavity top surface of the upper die 22 while the intermediate body 11 is slightly compressed. In this case, the thickness of the intermediate body 11 in a state in which the mold 20 has not yet not been clamped is preferably from 0.1 to 30 times and particularly preferably from 0.2 to 5 times the gap between the tip end surface of the projection 23 and the cavity top surface of the upper die 22 in a state in which the mold 20 is clamped. In this case, when the mold 20 is clamped and the intermediate body 11 is compressed between the tip end surface of the projection 23 and the cavity top surface of the upper die 22, the air permeability is preferably from 5 to 350 $cc/cm^2/second$ and particularly preferably from 10 to 200 $cc/cm^2/second$.

The intermediate body 11 is cut out according to need after the seat pad main body 2 has been formed.

Next, a procedure for producing the seat pad 1 with the mold 20 is described.

The lower die 21 and the upper die 22 are initially opened, and the reinforcing member 10 is caused to adhere to the cavity top surface of the upper die 22. In so doing, the opening 10a of the reinforcing member 10 is superposed with an opposing region of the cavity top surface, the opposing region opposing the projection 23, and the intermediate body 11 is disposed so as to cross the opposing region. In the present embodiment, each end side of the intermediate body 11 is connected to the inner peripheral edge of the opening 10a. Thus, only by disposing the reinforcing member 10 at a predetermined position, the intermediate body 11 can be easily disposed at the opposing region of the cavity top surface, the opposing region opposing the projection 23.

Next, the raw material of the foamed synthetic resin is injected into the lower die 21, the lower die 21 and the upper die 22 are clamped together, and the raw material of the foamed synthetic resin is foamed. The foamed synthetic resin is inflated toward the cavity top surface of the upper die 22 and charged into the cavity space in the mold 20. Thus, the seat pad main body 2 is formed and the reinforcing member 10 is integrated with the rear surface of the seat pad main body 2.

In so doing, as illustrated in FIG. 3, at the periphery of the projection 23, gas in the mold 20 is pushed by the foamed synthetic resin being inflated toward the tip end portion of the projection 23 as indicated by arrows B and enters the inside of the intermediate body 11 through the reinforcing member 10 as indicated by the arrows G. The gas having entered the inside of the intermediate body 11 passes through the inside of the intermediate body 11 as illustrated in FIG. 2 and is diffused from both the side edges of the intermediate body 11 to the gap between the tip end surface of the projection 23 and the cavity top surface of the upper die 22. In the present embodiment, part of the gas in the mold 20 is also absorbed into the reinforcing member 10. Part of this gas is directly diffused to the gap between the tip end surface of the projection 23 and the cavity top surface of the upper die 22 from the inner peripheral edge of the opening 10a of the reinforcing member 10 without passing through the intermediate body 11. At this time, the foamed synthetic resin does not substantially enter the space between the tip end surface of the projection 23 and the cavity top surface of the upper die 22. Thus, the burr portion that closes the through hole 3 is not formed.

By introducing the gas in the mold 20 into the space between the tip end surface of the projection 23 and the cavity top surface of the upper die 22 in the manner as described above, the gas is prevented from remaining in a corner portion where the outer peripheral surface of the projection 23 on the tip end side intersects the cavity top surface of the upper die 22. Thus, the foamed synthetic resin is sufficiently charged also into the corner portion. As a result, molding defects such as voids at the periphery of the through hole 3 can be sufficiently prevented from occurring without forming the burr portion that closes the through hole 3.

After the foamed synthetic resin has been cured, the mold 20 is opened and the seat pad 1 is demolded. After that, the intermediate body 11 that crosses the through hole 3 is cut out and the surface of the seat pad main body 2 is subjected to a finishing process according to need. Thus, the seat pad 1 is completed.

The thus produced seat pad 1 has the seat pad main body 2 that has the through hole 3 originally penetrating through the seat pad main body 2. For this reason, unlike the aforementioned related art, there is no need to remove the burr portion after the seat pad 1 has been demolded so as to cause the through hole 3 to penetrate through the seat pad main body 2. Furthermore, molding defects such as voids at the periphery of the through hole 3 can be sufficiently prevented from occurring without forming such a burr portion. Thus, the seat pad 1 having a high form accuracy of the outer surface can be easily produced while achieving a high yield.

[Second Embodiment]

Figure 7:
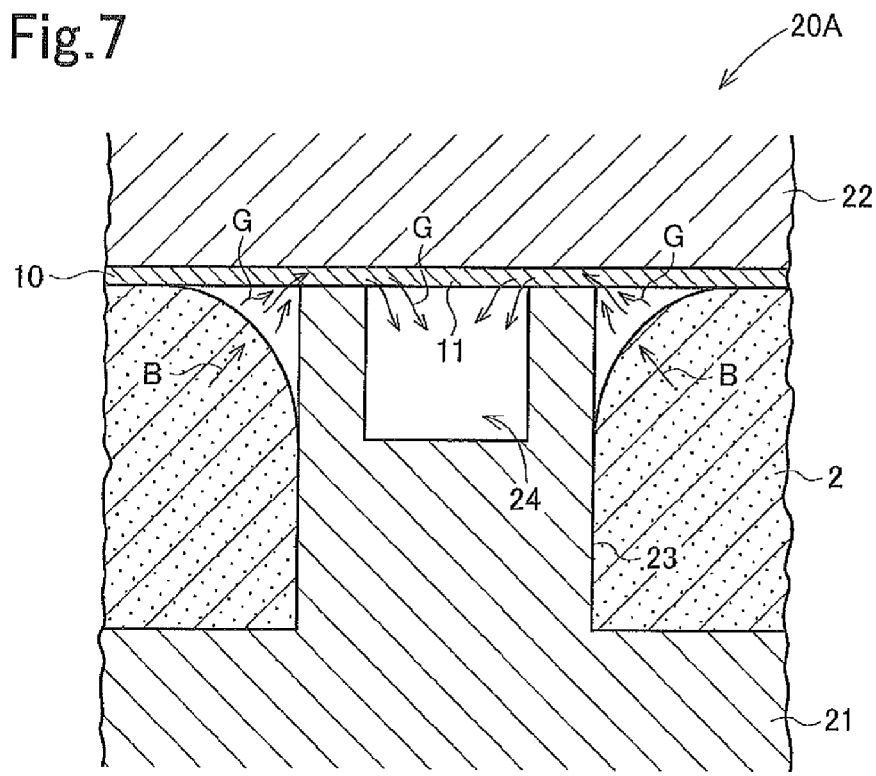
FIG. 7 is a longitudinal sectional view of a mold for foam molding used in a method for producing the foamed synthetic resin molded body according to an embodiment during foam molding.

FIG. 7 is a longitudinal sectional view of a mold for foam molding used in a method for producing the foamed synthetic resin molded body according to another embodiment during foam molding. FIG. 7 illustrates a portion similar to that illustrated in FIG. 3.

In a mold 20A illustrated in FIG. 7, a recess 24 is formed in the tip end surface of the projection 23 for forming the through hole. During foam molding, gas, which has been introduced from the inside of the mold 20 into the space between the projection 23 and the cavity top surface of the upper die 22 through either or both of the intermediate body 11 and the reinforcing member 10, accumulates in the recess 24. In the present embodiment, the intermediate body 11 and the recess 24 are included in a gas introduction means that introduce the gas in the mold 20A into the space between the tip end surface of the projection 23 and the cavity top surface of the upper die 22 during foam molding. The recess 24 is positioned close to the center of the tip end surface of the projection 23 compared to the outer peripheral edge of the tip end surface of the projection 23 and open only toward the cavity top surface of the upper die 22 side. The volume of the recess 24 is determined in accordance with the volume and the like of the mold 20. In FIG. 7, a single recess 24 is provided near the center of the tip end surface of the projection 23. However, the number and arrangement of the recesses 24 are not limited to this. Also in FIG. 7, the intermediate body 11 disposed on the recess 24 is superposed with the recess 24. However, the intermediate body 11 is not necessarily superposed with the recess 24.

Other structures illustrated in FIG. 7 are similar to those of the aforementioned first embodiment. In FIG. 7, the same reference signs as those in FIGS. 1a to 6 denote the same elements. A method for producing the seat pad 1 using the mold 20A is similar to that of the first embodiment.

In the case where the seat pad 1 is produced by using the mold 20A, functional effects similar to those achieved by using the mold 20 of the first embodiment are also achieved.

In the case where the seat pad 1 is produced by using the mold 20A, the recess 24 that allows the gas to accumulate therein is provided in the tip end surface of the projection 23. Thus, an increased amount of gas in the mold 20 can be introduced into the space between the tip end surface of the projection 23 and the cavity top surface of the upper die 22 during foam molding. As a result, the gas can be more effectively prevented from remaining in the corner portion where the outer peripheral surface of the projection 23 on the tip end side intersects the cavity top surface of the upper die 22.

[Third Embodiment]

Figure 8A:
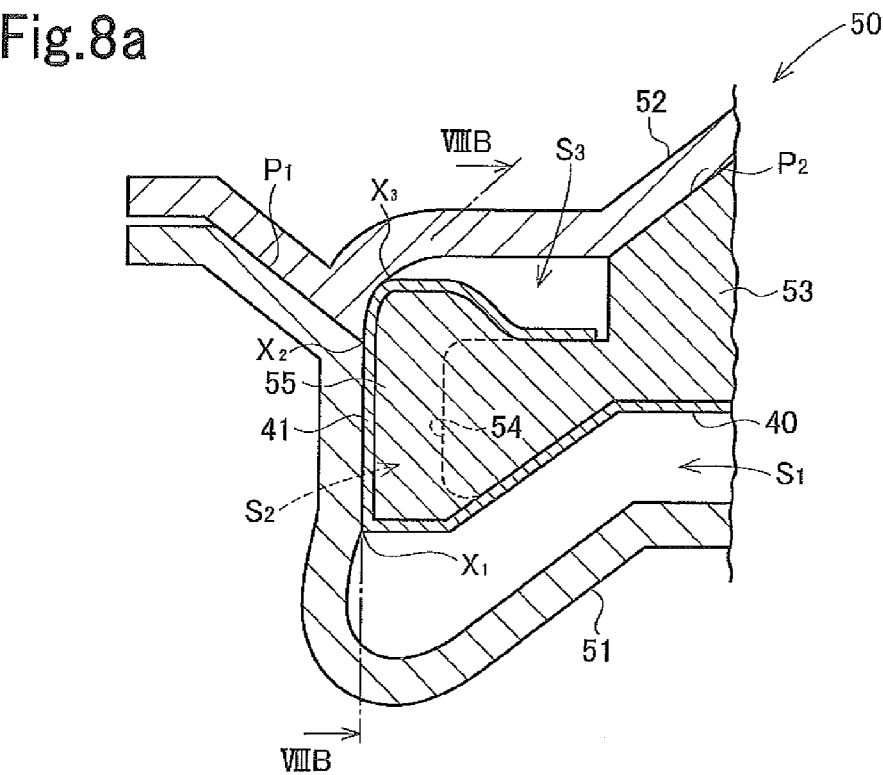
FIG. 8a is a longitudinal sectional view of a mold for foam molding used in a method for producing a foamed synthetic resin molded body according to an embodiment.
Figure 8B:
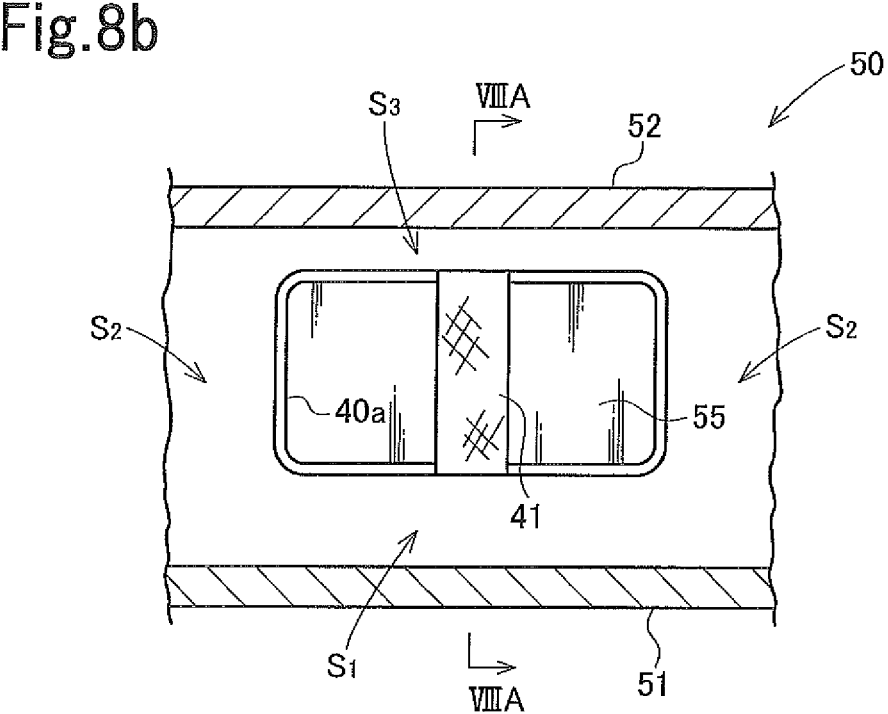
Figure 9A:
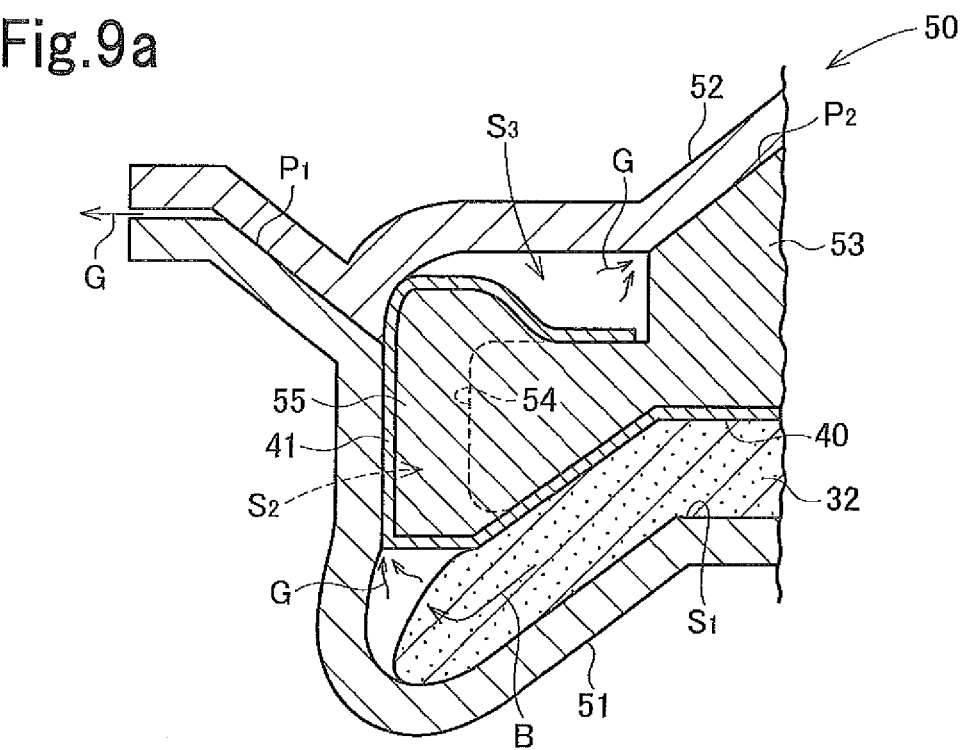
FIG. 9a is a longitudinal sectional view of a portion similar to that illustrated in FIG. 8a during foam molding.
Figure 9B:
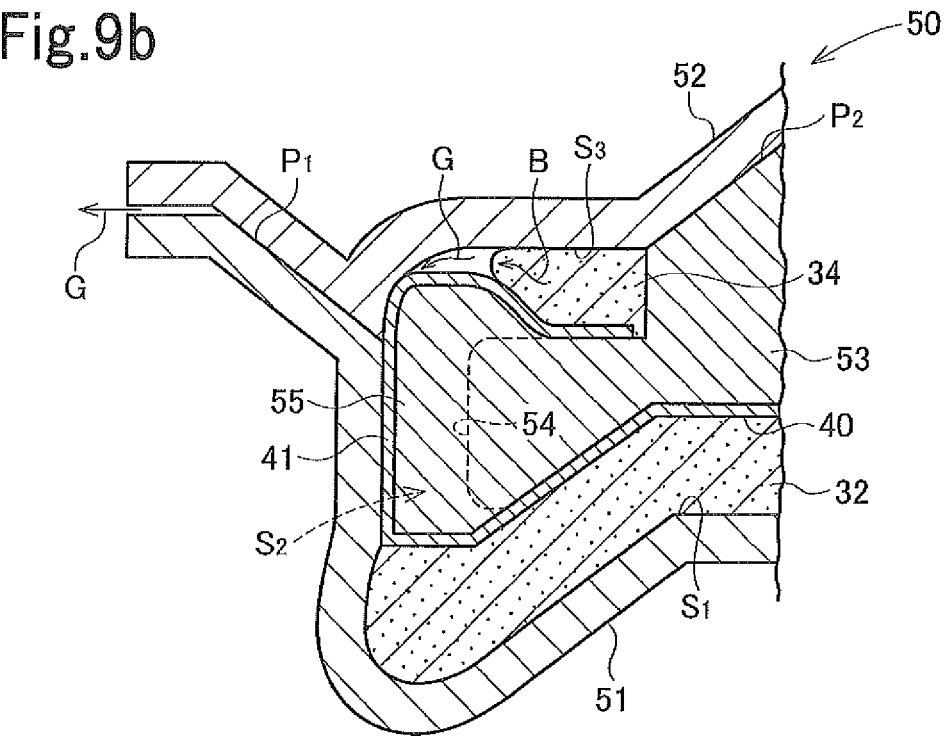
FIG. 9b is a longitudinal sectional view of a portion similar to that illustrated in FIG. 8a during foam molding.
Figure 10:
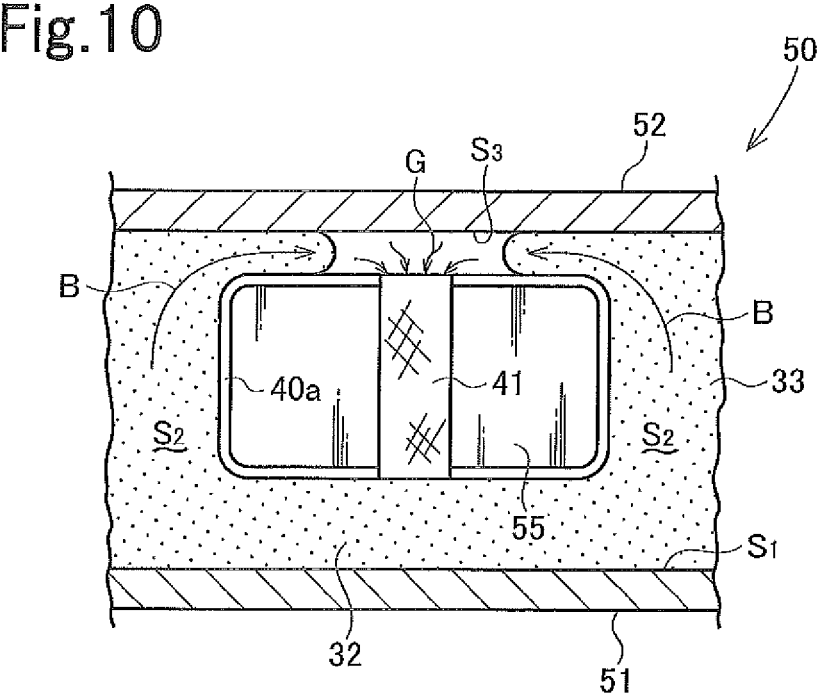
FIG. 10 is a longitudinal sectional view of a portion similar to that illustrated in FIG. 8b during foam molding.
Figure 11A:
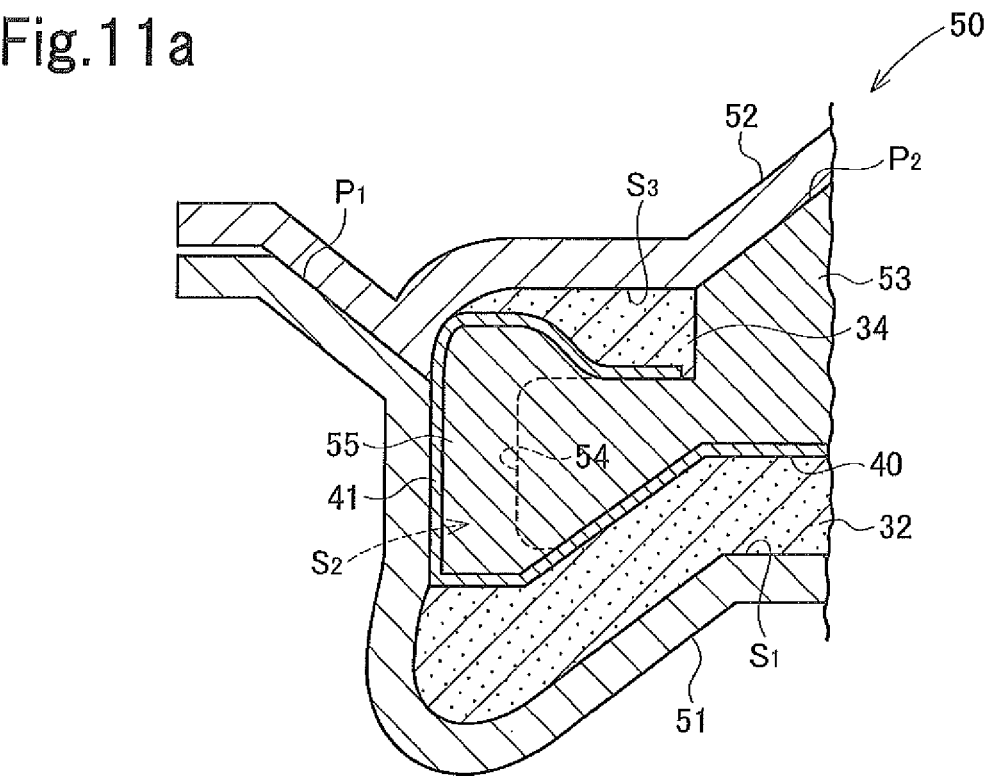
FIG. 11a is a longitudinal sectional view of a portion similar to those illustrated in FIGS. 8a and 8b when foam molding is completed.
Figure 11B:
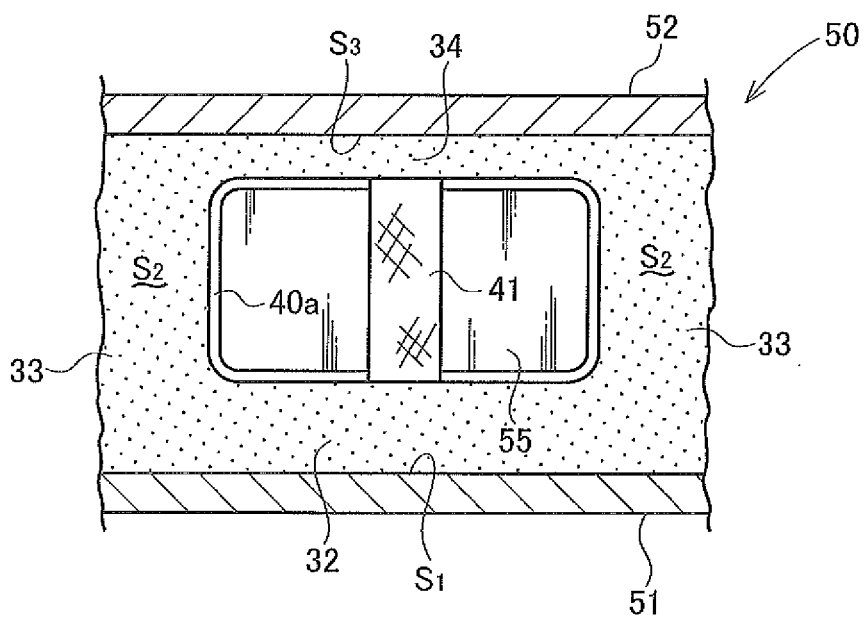
FIG. 11b is a longitudinal sectional view of a portion similar to those illustrated in FIGS. 8a and 8b when foam molding is completed.
Figure 12:
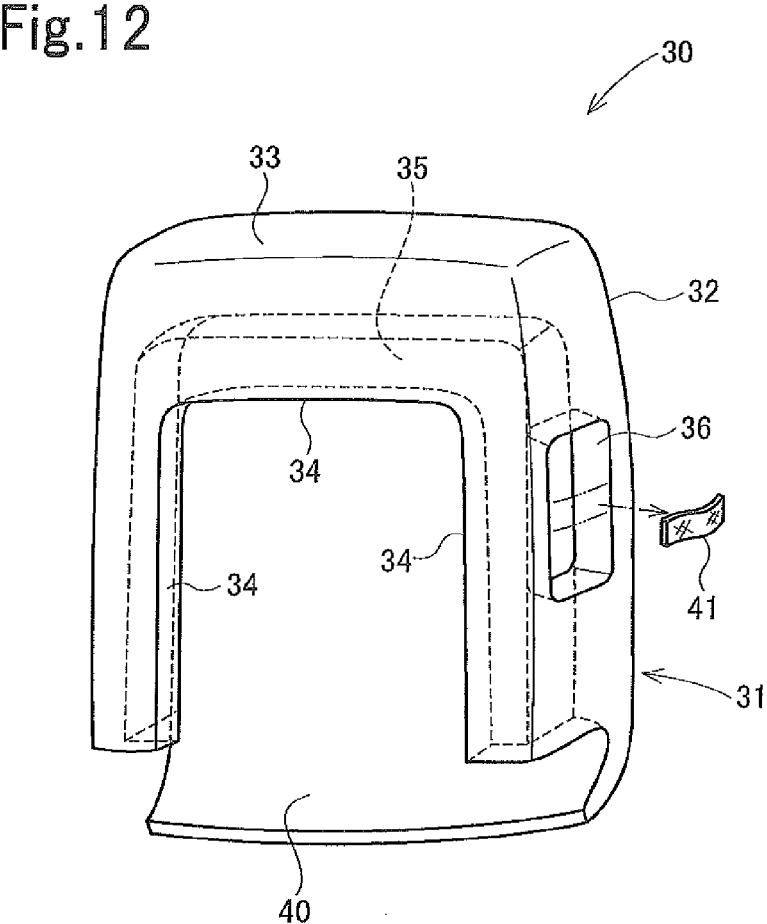

FIGS. 8a and 8b are longitudinal sectional views of a mold for foam molding used in a method for producing a foamed synthetic resin molded body according to another embodiment. FIG. 8a illustrates a section taken along line VIIIA-VIIIA in FIG. 8b, and FIG. 8b illustrates a section taken along line VIIIB-VIIIB in FIG. 8a. FIGS. 9a and 9b are longitudinal sectional views of portions similar to those illustrated in FIG. 8a during foam molding. FIG. 9a illustrates a comparatively early stage of a form molding process, and FIG. 9b illustrates a comparatively late stage of the form molding process. FIG. 10 is a longitudinal sectional view of a portion similar to that illustrated in FIG. 8b at a time similar to that of FIG. 9b. FIGS. 11a and 11b are longitudinal sectional views of portions similar to those illustrated in FIGS. 8a and 8b, respectively, when foam molding is completed. FIG. 12 is a perspective view of a seat pad as the foamed synthetic resin molded body produced by using this mold.

A seat pad 30 of the present embodiment is a back pad included in a backrest of a vehicle seat. The seat pad 30 also includes a seat pad main body 31 and a reinforcing member 40. The seat pad main body 31 is formed of a foamed synthetic resin such as polyurethane foam. The reinforcing member 40 is disposed along a rear surface of the seat pad main body 31. The reinforcing member 40 is integrally formed with the seat pad main body 31 so as to be integrated with the seat pad main body 31. The seat pad 30 is attached to a back frame (not shown) of a seat, and the outer surface of the seat pad 30 is covered with a skin material (not shown). In the following description of portions of the seat pad 30, the up-down direction, the left-right direction, and the front-rear direction coincide with those for the occupant seated in a seat that uses the seat pad 30.

As illustrated in FIG. 12, the seat pad main body 31 has a main body portion 32, a first extension 33, and a second extension 34. The main body portion 32 covers the front surface side of the back frame. The first extension 33 extends rearward from the upper edge and left and right side edges of the rear surface of the main body portion 32. The second extension 34 projects from the rear end of the first extension 33 toward the center of the rear surface of the main body portion 32. These main body portion 32, the first extension 33, and the second extension 34 are integrally formed with one another. The first extension 33 and the second extension 34 are continuously formed along the upper edge and the left and right side edges of the rear surface of the main body portion 32. A space surrounded by the main body portion 32, the first extension 33, and the second extension 34 defines a recess 35, which is engaged with an upper portion and left and right side portions of the back frame. The recess 35 is open toward the central portion of the rear surface of the main body portion 32.

As illustrated in FIG. 12, in the present embodiment, an airbag device housing portion 36 that houses a side airbag device (not shown) is provided on the right side surface of the seat pad main body 31. The airbag device housing portion 36 serves as a hole-like portion. The airbag device housing portion 36 is defined by a through hole that penetrates in the left-right direction through part of the first extension 33 along the right side edge of the main body portion 32. The inner side of the airbag device housing portion 36 is communicated with the inside of the recess 35. The side airbag device is attached to the side portion of the back frame and to be disposed in the airbag device housing portion 36 through the recess 35 when attaching the seat pad 30 to the back frame. In the present embodiment, the opening shape of the airbag device housing portion 36 is a substantially rectangular shape elongated in the up-down direction. However, the opening shape of the airbag device housing portion 36 is not limited to this. In the present embodiment, the seat pad 30 is suitable to a seat on the right side of the vehicle. However, by left-right inverting the structure, the seat pad 30 can be suitable to a seat on the left side of the vehicle.

The reinforcing member 40 is disposed along the rear surface of the main body portion 32 and the recess 35 side surfaces of the first extension 33 and the second extension 34. The reinforcing member 40 has an opening 40a (FIG. 8b) that is superposed with the airbag device housing portion 36. A peripheral portion of the opening 40a covers the inner peripheral surface of the airbag device housing portion 36.

Next, a mold 50 for forming the seat pad 30 is described. As illustrated in FIGS. 8a and 8b, in the present embodiment, the mold 50 includes a lower die 51, an upper die 52, and an intermediate die 53, which is set in the upper die 52. In the present embodiment, the intermediate die 53 corresponds to a first die in claim 6, the lower die 51 corresponds to a second die in claim 6, and the upper die 52 corresponds to another die in claim 6. Also in the present embodiment, as is the case with the mold 20 in the aforementioned first embodiment, the front surface side of the seat pad main body 31 is formed by a cavity surface of the lower die 51. The rear surface side of the seat pad main body 31 is formed by cavity surfaces of the upper die 52 and the intermediate die 53. Hereafter, unless otherwise specified, the up-down direction and the left-right direction of the mold 50 respectively refer to the up-down direction and the left-right direction in FIGS. 8a to 11. The up-down direction, the left-right direction, and the front-rear direction of the seat pad 30 refer to, as described above, those for the occupant seated in a seat that uses the seat pad 30.

A protrusion 54 for forming the recess 35 on the rear surface side of the seat pad main body 31 laterally protrudes from a side surface of the intermediate die 53. The protrusion 54 continuously protrudes from the intermediate die 53 in three directions so as to continuously form the recess 35 on the upper side and the both the left and right sides of the rear surface of the seat pad main body 31. The main body portion 32 of the seat pad main body 31 is formed by using a cavity space $S_1$ between a cavity bottom surface of the lower die 51 and a lower surface of the intermediate die 53. The first extension 33 is formed by using a cavity space $S_2$ between a tip end surface of the protrusion 54 in the protruding direction and a cavity side surface of the lower die 51. The second extension 34 is formed by using a cavity space $S_3$ between an upper surface of the protrusion 54 and a cavity top surface of the upper die 52.

In the present embodiment, a projection 55 for forming the airbag device housing portion 36 laterally projects further from the protrusion 54 of the intermediate die 53, which faces the cavity space $S_2$ for forming the first extension 33 on the right side of the seat pad main body 31.

In the present embodiment, as illustrated in FIG. 8a, when the lower die 51 and the upper die 52 are clamped together, a tip end surface of the projection 55 in the projecting direction opposes both the cavity side surface of the lower die 51 and a cavity side surface of the upper die 52. That is, in the present embodiment, a parting line $P_1$ between the lower die 51 and the upper die 52 is disposed at a position that crosses a region opposite the tip end surface of the projection 55. A parting line $P_2$ between the upper die 52 and the intermediate die 53 is positioned on a tip end side of the second extension 34 of the seat pad main body 31. In the present embodiment, the mold 50 includes a gas exhaust means (not shown), which exhausts gas in the mold 50 by suction to the outside of the mold 50 through the parting lines $P_1$, $P_2$.

As described above, the parting line $P_1$ crosses $X_2$, that is, crosses the region opposite the tip end surface of the projection 55, instead of $X_3$, which is an outermost position on the upper die 52 side in the cavity side surface of the mold 50. This structure is effective for a mold in which, when the lower die 51 and the upper die 52 are clamped together as illustrated in FIG. 8a, a position X' is located further inward than $X_3$, which is the outermost position on the upper die 52 side. X' is a position where lateral depression, which may cause breaks of a product when the mold is opened after molding has been performed, is reduced as much as possible. The reason for this is that, in order to allow the intermediate die 53 to be opened and closed, the $X_2$ needs to be positioned further outward than the $X_1$.

In this mold 50, when the lower and upper dies 51 and 52 are clamped together, the tip end surface of the projection 55 opposes the cavity side surfaces of the upper and lower dies 51 and 52 with a predetermined gap therebetween. Also in the present embodiment, the gap between the tip end surface of the projection 55 and the cavity side surfaces of the upper and lower dies 51 and 52 in a clamped state is set to have such a size that the gas in the mold 50 can enter the gap and the raw material of the foamed synthetic resin foamed in the mold 50 cannot enter the gap. A preferable range of the gap between the tip end surface of the projection 55 and the cavity side surfaces of the upper and lower dies 51 and 52 in a clamped state is similar to that of the gap between the tip end surface of the projection 23 and the cavity top surface of the upper die 22 in the aforementioned first embodiment.

Also in the present embodiment, when the mold 50 is clamped, an intermediate body 41 formed of a material having a high air permeability is disposed between the tip end surface of the projection 55 and the cavity side surfaces of the upper and lower dies 51 and 52. In the present embodiment, the intermediate body 41 and the gas exhaust means are included in a gas introduction means that introduces the gas in the mold 50 into the space between the tip end surface of the projection 55 and the cavity side surfaces of the upper and lower dies 51 and 52 during foam molding.

Also in the present embodiment, the intermediate body 41 has a belt-like shape. As illustrated in FIG. 8b, the belt-like intermediate body 41 is disposed so as to cross the tip end surface of the projection 55 in the up-down direction (the up-down direction of the mold 50, which corresponds to the front-rear direction of the seat pad 30; this is also applicable to the following description). End sides of the intermediate body 41 in the longitudinal direction reach upper and lower edges of the tip end surface of the projection 55. Also in the present embodiment, the intermediate body 41 is provided so as to be integral with the reinforcing member 40, and each end side of the intermediate body 41 in the longitudinal direction is continuous with an inner peripheral edge of the opening 40a of the reinforcing member 40. Physical characteristics, preferable ranges and supplementary matters regarding the structures and the like, preferable materials to form the intermediate body 41, and the like of the intermediate body 41 are similar to those of the intermediate body 11 of the aforementioned first embodiment.

Next, a procedure for producing the seat pad 30 with the mold 50 is described.

The lower die 51 and the upper die 52 are initially opened, and the reinforcing member 40 is caused to adhere to a cavity surface of the intermediate die 53. In so doing, the projection 55 of the intermediate die 53 is inserted into the opening 40a of the reinforcing member 40, the tip end surface of the projection 55 is superposed with the intermediate body 41, so that the intermediate body 41 crosses the tip end surface of the projection 55 in the up-down direction. Also in the present embodiment, each end of the intermediate body 41 is connected to the inner peripheral edge of the opening 40a. Thus, only by disposing the reinforcing member 40 at a predetermined position, the intermediate body 41 can be easily disposed at a position between the tip end surface of the projection 55 and the cavity side surfaces of the lower die 51 and the upper die 52.

Next, the raw material of the foamed synthetic resin is injected into the lower die 51, the lower die 51 and the upper die 52 are clamped together, and the raw material of the foamed synthetic resin is foamed. The foamed synthetic resin is charged into the cavity spaces $S_1$, $S_2$, and $S_3$ in this order as illustrated in FIGS. 9a, 9b, and 10. By doing this, the main body portion 32 of the seat pad main body 31, the first extension 33, and the second extension 34 are integrally formed with one another. The reinforcing member 40 is integrated with the rear surfaces (in the first extension 33 and the second extension 34, surfaces facing the inner side of the recess 35) of these components.

In so doing, as illustrated in FIG. 9a, at the periphery of the projection 55, the foamed synthetic resin is initially inflated toward the tip end side of the projection 55 along the cavity bottom surface of the lower die 51 and lower surfaces of the protrusion 54 and the projection 55 of the intermediate die 53 as indicated by the arrow B. The gas on the lower side of the projection 55 is pushed by the foamed synthetic resin and enters the inside of the intermediate body 41 from a lower end side of the intermediate body 41 through the reinforcing member 40 as indicated by the arrow G. Next, as illustrated in FIGS. 9b and 10, the foamed synthetic resin passes through the cavity space $S_2$ on both sides of the projection 55 and flows into the cavity space $S_3$. As indicated by the arrows B in FIG. 10, the foamed synthetic resin having flowed into the cavity space $S_3$ advances from the left and right sides of the projection 55 in FIG. 10 toward the center in the left-right direction of the upper surface of the projection 55. The gas on the upper side of the projection 55 is pushed by the foamed synthetic resin and, as indicated by the arrows G, enters the inside of the intermediate body 41 from the upper end side of the intermediate body 41 through the reinforcing member 40. At this time, the foamed synthetic resin does not substantially enter the space between the tip end surface of the projection 55 and the cavity side surfaces of the upper and lower dies 51 and 52. Thus, the burr portion that closes the airbag device housing portion 36 is not formed.

The gas having entered the inside of the intermediate body 41 from the lower and upper end sides of the intermediate body 41 passes through the inside of the intermediate body 41 and is diffused from both the side edges of the intermediate body 41 to the gap between the tip end surface of the projection 55 and the cavity side surfaces of the upper and lower dies 51 and 52. Also in the present embodiment, part of the gas in the mold 50 is also absorbed into the reinforcing member 40. Part of this gas is directly diffused to the gap between the tip end surface of the projection 55 and the cavity side surfaces of the upper and lower dies 51 and 52 from the inner peripheral edge of the opening 40a of the reinforcing member 40 without passing through the intermediate body 41.

In the present embodiment, the gas diffused to the gap between the tip end surface of the projection 55 and the cavity side surfaces of the upper and lower dies 51 and 52 is exhausted to the outside of the mold 50 by the gas exhaust means through the parting line $P_1$. Since the intermediate body 41 is superposed with the parting line $P_1$, part of the gas having entered the inside of the intermediate body 41 is exhausted directly from the inside of the intermediate body 41 to the outside of the mold 50 through the parting line $P_1$ by suction.

In this shape of the mold 50, in the related art, gas in the mold 50 comparatively easily remains in a corner portion where the lower surface of the projection 55 intersects the cavity side surface of the lower die 51 and in a corner portion where the upper surface of the projection 55 intersects the cavity side surface of the upper die 52 during foam molding. However, in the present invention, by the intermediate body 41 as the gas introduction means, the gas is introduced from these corner portions to the space between the tip end surface of the projection 55 and the cavity side surfaces of the upper and lower dies 51 and 52. Thus, the gas is prevented from remaining in these corner portions, and accordingly, the foamed synthetic resin is sufficiently charged into these corner portions as illustrated in FIGS. 11a and 11b. As a result, molding defects such as voids at the periphery of the airbag device housing portion 36 can be sufficiently prevented from occurring without forming a burr portion that closes the airbag device housing portion 36.

As described above, in the present embodiment, the gas is exhausted from the space between the tip end surface of the projection 55 and the cavity side surfaces of the upper and lower dies 51 and 52 to the outside of the mold 50 through the parting line $P_1$ by the gas exhaust means. Thus, the gas can be more effectively prevented from remaining in the corner portions between the outer peripheral surface of the projection 55 and the cavity side surfaces of the upper and lower dies 51 and 52.

After the foamed synthetic resin has been cured, the mold 50 is opened and the seat pad 30 is demolded. After that, the intermediate body 41 that crosses the airbag device housing portion 36 is cut out and the surface of the seat pad main body 31 is subjected to a finishing process according to need. Thus, the seat pad 30 is completed.

The thus produced seat pad 30 has the seat pad main body 31 that has the airbag device housing portion 36 originally penetrating through the seat pad main body 31. For this reason, unlike the aforementioned related art, there is no need to removing the burr portion after the seat pad 30 has been demolded so as to cause the airbag device housing portion 36 to penetrate through the seat pad main body 31. Furthermore, molding defects such as voids at the periphery of the airbag device housing portion 36 can be sufficiently prevented from occurring without forming such a burr portion. Thus, the seat pad 30 having a high form accuracy of the outer surface can be easily produced while achieving a high yield.

[Fourth Embodiment]

Figure 13:
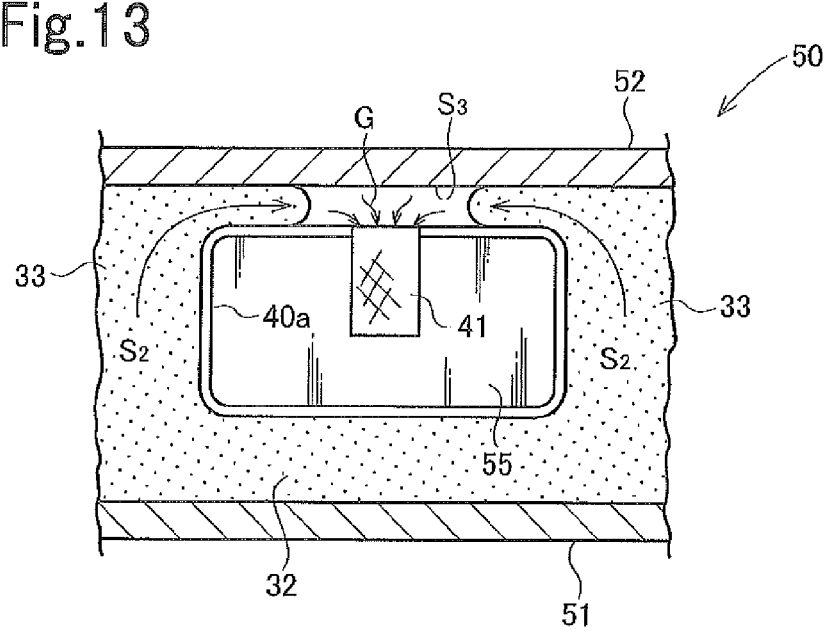
FIG. 13 is a longitudinal sectional view of a mold for foam molding used in a method for producing the foamed synthetic resin molded body according to an embodiment during foam molding.

FIG. 13 is a longitudinal sectional view of a mold for foam molding used in a method for producing the foamed synthetic resin molded body according to another embodiment at a time similar to that of FIG. 10.

During foam molding with the aforementioned mold 50, at the periphery of the projection 55, the foamed synthetic resin is initially charged into the cavity space on the lower side the projection 55 and then charged into the cavity space on the upper side of the projection 55. At a stage at which the foamed synthetic resin is charged into the cavity space on the lower side of the projection 55, the raw material of the foamed synthetic resin is not significantly resinified, and the viscosity of the foamed synthetic resin is comparatively low. Thus, the foamed synthetic resin is comparatively easily charged into the corner portion between the lower surface of the projection 55 and the cavity side surface of the lower die 51 even without introducing the gas on the lower side of the projection 55 to the space between the tip end surface of the projection 55 and the cavity side surfaces of the upper and lower dies 51 and 52 using the gas introduction means.

In contrast, at a stage at which the foamed synthetic resin is charged into the cavity space on the upper side of the projection 55, resinification of the raw material of foamed synthetic resin advances, and the viscosity of the foamed synthetic resin is comparatively high. For this reason, it is highly necessary to introduce the gas on the upper side of the projection 55 to the space between the tip end surface of the projection 55 and the cavity side surfaces of the upper and lower dies 51 and 52 using the gas introduction means.

In view of the above-described situation, in the embodiment illustrated in FIG. 13, the intermediate body 41 included in the gas introduction means is formed to have a length in the up-down direction that is shorter than that of the aforementioned third embodiment, and only the upper end side of the intermediate body 41 is communicated with the cavity space on the upper side of the projection 55 (in the present embodiment, only the upper end side of the intermediate body 41 is continuous with the inner peripheral edge of the opening 40a of the reinforcing member 40).

Other structures in the present embodiment are similar to those of the aforementioned third embodiment. In FIG. 13, the same reference signs as those in FIGS. 8a to 12 denote the same elements.

Also in the present embodiment, during foam molding, the gas on the upper side of the projection 55, which is part of a region around the projection 55 where the gas comparatively easily remains, is introduced to the space between the tip end surface of the projection 55 and the cavity side surfaces of the upper and lower dies 51 and 52 by the intermediate body 41. Thus, molding defects such as voids at the periphery of the airbag device housing portion 36 of the seat pad 30 can be sufficiently prevented from occurring.

Also in the present embodiment, the size of the intermediate body 41 is comparatively small. Thus, even in the case where the intermediate body 41 is cut out after the seat pad 30 has been demolded, waste of material is suppressed. Furthermore, since only the upper end side of the intermediate body 41 is continuous with the reinforcing member 40, the intermediate body 41 is easily cut out.

[Fifth Embodiment]

The present invention can also be applied to a foamed synthetic resin molded body having a non-through hole-like portion.

Figure 14:
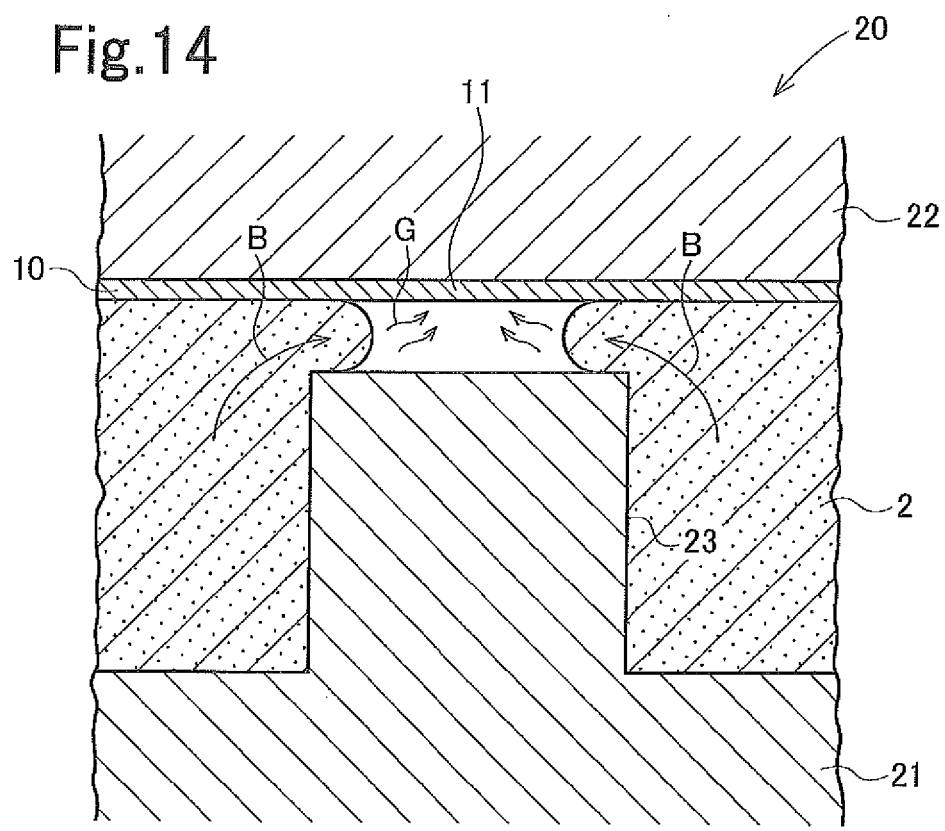
FIG. 14 is a longitudinal sectional view of a mold for foam molding used in a method for producing a foamed synthetic resin molded body according to an embodiment.
Figure 15A:
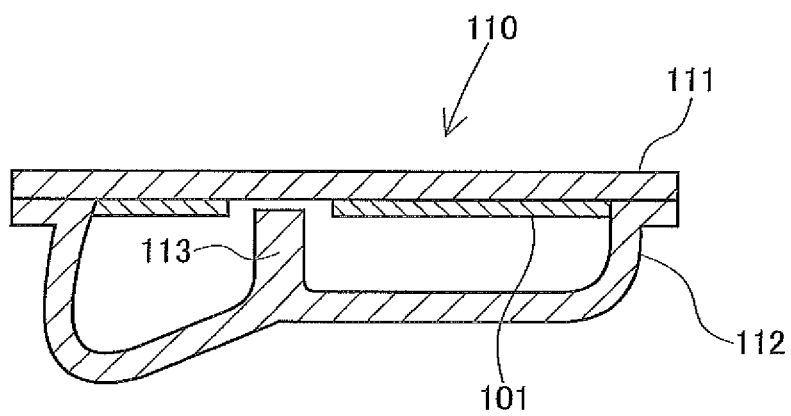
FIG. 15a is a longitudinal sectional view of a foamed molded body for a seat pad and a mold for molding of the foamed molded body according to a related-art.
Figure 15B:
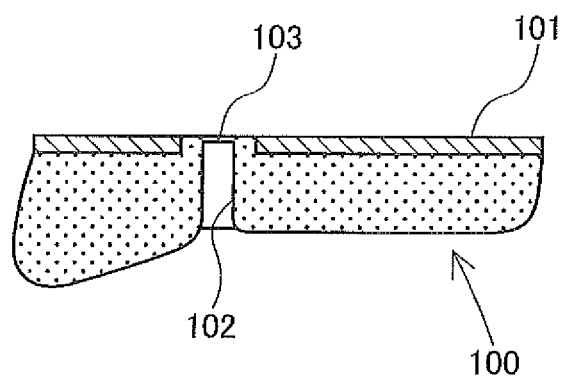
FIG. 15b is a longitudinal sectional view of the foamed molded body for a seat pad and the mold for molding of the foamed molded body according to the related-art.
Figure 16A:
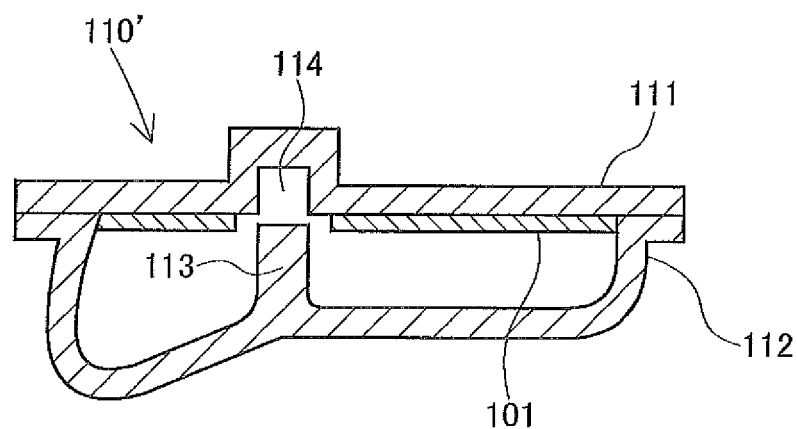
FIG. 16a is a longitudinal sectional view of a foamed molded body for a seat pad and a mold for molding of the foamed molded body according to a related-art.
Figure 16B:
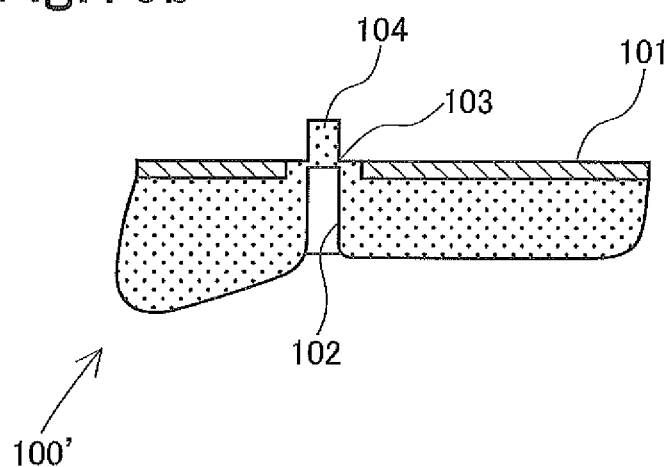
FIG. 16b is a longitudinal sectional view of the foamed molded body for a seat pad and the mold for molding of the foamed molded body according to the related-art.

FIG. 14 is a longitudinal sectional view of a modification in which the mold 20 according to the aforementioned first embodiment is changed so that the seat pad 1 formed with this mold 20 has a non-through hole-like portion. FIG. 14 illustrates a portion similar to that illustrated in FIG. 3 at a point of time similar that of FIG. 3.

In the present embodiment, in a state in which the mold 20 is clamped, the size of the gap, which is formed between the tip end portion of the projection 23 for forming the hole-like portion in the seat pad 1 and the cavity top surface of the upper die 22, is determined so that the raw material of foamed synthetic resin foamed in the mold 20 is allowed to enter the gap. By charging the foamed synthetic resin into the space between the tip end portion of the projection 23 and the cavity top surface of the upper die 22 when foam molding is performed, the hole-like portion of the seat pad 1 formed by the projection 23 is a non-through hole.

Other structures of the mold 20 in the present embodiment are similar to those of the aforementioned first embodiment, and the same reference signs as those in FIGS. 1a to 4 denote the same elements.

A method for producing the seat pad 1 using the mold 20 is also similar to that of the first embodiment.

In the case where the seat pad 1 (seat pad main body 2) is foam molded with this mold 20, when the foamed synthetic resin having been inflated from the lower die 21 toward the cavity top surface of the upper die 22 exceeds the tip end surface of the projection 23, the foamed synthetic resin enters the space between the tip end surface of the projection 23 and the cavity top surface of the upper die 22. In so doing, the gas in the mold 20 is introduced into the space between the tip end surface of the projection 23 and the cavity top surface of the upper die 22 by the intermediate body 11.

After that, as the foamed synthetic resin is charged into the space between the tip end surface of the projection 23 and the cavity top surface of the upper die 22, the excess gas existing between these surfaces is absorbed by the intermediate body 11 (and the reinforcing member 10 continuous with the intermediate body 11). Thus, the gas is prevented from remaining in the space between the tip end surface of the projection 23 and the cavity top surface of the upper die 22, and the foamed synthetic resin is sufficiently charged into the space between these surfaces.

As described above, in the present embodiment, the gas in the mold 20 is introduced into the space between the tip end surface of the projection 23 and the cavity top surface of the upper die 22 by the intermediate body 11. Accordingly, even when the gap between these surfaces is comparatively small, the foamed synthetic resin can smoothly enter the space between these surfaces. Thus, even when the thickness of the bottom surface of the non-through hole-like portion is comparatively small, the occurrence of molding defects in the bottom surface of the hole-like portion can be sufficiently prevented.

In the present embodiment, a modification, in which the mold 20 according to the aforementioned first embodiment is changed so that the seat pad 1 formed with this mold 20 has a non-through hole-like portion, is described. The mold 50 in the aforementioned third and fourth embodiments can be changed so that the seat pad 30 formed with the mold 50 has a non-through airbag device housing portion 36.

The structures described above are examples of the present invention, and the present invention may adopt structures other than the above description.

For example, in the embodiment described above, the intermediate body formed of a material having high air permeability is disposed between the projection for forming the hole-like portion in the foamed synthetic resin molded body and the cavity inner surface opposite the projection, thereby configuring the gas introduction means that introduces gas in the mold into the space between the projection and the cavity inner surface. However, the structure of the gas introduction means is not limited to this. For example, the gas introduction means may be configured as follows: that is, an air vent path communicated with the outside of the mold is provided in either or both of the projection for forming the hole-like portion and the cavity inner surface opposite the projection, and gas in the mold is introduced into these air vent paths.

In the embodiments described above, examples of the present invention applied to a seat pad are described. However, the present invention can also be applied to the foamed synthetic resin molded body other than a seat pad.

Although the specific forms of the present invention have been described in detail, one skilled in the art should clearly understand that a variety of changes are possible without departing from the intention and scope of the present invention.

The present application is based on the Japanese Patent Application (Japanese Patent Application No. 2011-069414) filed on Mar. 28, 2011, the entire contents of which are incorporated herein by reference.

The invention claimed is:

1. A method for producing a foamed synthetic resin molded body having a through hole in an outer surface thereof using a mold for foam molding that includes at least a first die and a second die,
   wherein a projection for forming the through hole is provided on a cavity inner surface of the first die,
   wherein, when the mold for foam molding is clamped, in the mold for foam molding, a tip end surface of the projection in a projecting direction opposes a cavity inner surface of the second die with a predetermined gap formed therebetween, and
   wherein, when the foamed synthetic resin molded body is formed by foam molding, gas in the mold for foam molding is introduced into a space between the tip end surface of the projection and the cavity inner surface of the second die by gas introduction means,
   wherein a portion of the through hole is not covered by the gas introduction means.

2. The method for producing the foamed synthetic resin molded body according to claim 1,
   wherein the gas introduction means has an intermediate body disposed between the tip end surface of the projection and the cavity inner surface of the second die in a state in which the mold for foam molding is clamped, and
   wherein the intermediate body is formed of a material having a high air permeability of 20 to 350 cc/cm$^2$/second.

3. The method for producing the foamed synthetic resin molded body according to claim 2,
   wherein a reinforcing member is disposed along at least part of an outer surface of the foamed synthetic resin molded body, and the reinforcing member is integrally formed with the foamed synthetic resin molded body so as to be integrated with the foamed synthetic resin molded body, and
   wherein the intermediate body is provided so as to be integral with the reinforcing member.

4. The method for producing the foamed synthetic resin molded body according to claim 2,
   wherein the intermediate body is formed of a fiber assembly, the unit weight of which is 50 to 250 g/m$^2$.

5. The method for producing the foamed synthetic resin molded body according to claim 3,
   wherein the intermediate body is formed of a fiber assembly, the unit weight of which is 50 to 250 g/m$^2$.

6. The method for producing the foamed synthetic resin molded body according to claim 2,
   wherein the intermediate body is disposed so as to cross the through hole.

7. The method for producing the foamed synthetic resin molded body according to claim 3,
   wherein the intermediate body is disposed so as to cross the through hole.

8. The method for producing the foamed synthetic resin molded body according to claim 4,
   wherein the intermediate body is disposed so as to cross the through hole.

9. The method for producing the foamed synthetic resin molded body according to claim 1,
   wherein, in the state in which the mold for foam molding is clamped, the tip end surface of the projection opposes both of the cavity inner surface of the second die and a cavity inner surface of another die, and
   wherein the mold for foam molding includes gas exhaust means that exhausts the gas in the mold for foam molding to the outside of the mold for foam molding through a parting line between the second die and the another die.

10. The method for producing the foamed synthetic resin molded body according to claim 2,
    wherein, in the state in which the mold for foam molding is clamped, the tip end surface of the projection opposes both of the cavity inner surface of the second die and a cavity inner surface of another die, and
    wherein the mold for foam molding includes gas exhaust means that exhausts the gas in the mold for foam molding to the outside of the mold for foam molding through a parting line between the second die and the another die.

11. The method for producing the foamed synthetic resin molded body according to claim 3,
    wherein, in the state in which the mold for foam molding is clamped, the tip end surface of the projection opposes both of the cavity inner surface of the second die and a cavity inner surface of another die, and
    wherein the mold for foam molding includes gas exhaust means that exhausts the gas in the mold for foam molding to the outside of the mold for foam molding through a parting line between the second die and the another die.

12. The method for producing the foamed synthetic resin molded body according to claim 4,
    wherein, in the state in which the mold for foam molding is clamped, the tip end surface of the projection opposes both of the cavity inner surface of the second die and a cavity inner surface of another die, and
    wherein the mold for foam molding includes gas exhaust means that exhausts the gas in the mold for foam molding to the outside of the mold for foam molding through a parting line between the second die and the another die.

13. The method for producing the foamed synthetic resin molded body according to claim 5,
    wherein, in the state in which the mold for foam molding is clamped, the tip end surface of the projection opposes both of the cavity inner surface of the second die and a cavity inner surface of another die, and
    wherein the mold for foam molding includes gas exhaust means that exhausts the gas in the mold for foam molding to the outside of the mold for foam molding through a parting line between the second die and the another die.

14. A method for producing a foamed synthetic resin molded body having a through hole in an outer surface thereof using a mold for foam molding that includes at least a first die and a second die,
    wherein a projection for forming the through hole is provided on a cavity inner surface of the first die,
    wherein, when the mold for foam molding is clamped, in the mold for foam molding, a tip end surface of the projection in a projecting direction opposes a cavity inner surface of the second die with a predetermined gap formed therebetween, and
    wherein, when the foamed synthetic resin molded body is formed by foam molding, gas in the mold for foam molding is introduced into a space between the tip end surface of the projection and the cavity inner surface of the second die by gas introduction means,
    wherein a portion of the gas introduction means that is superposed with the through hole is removed.

* * * * *